US007673246B2

(12) United States Patent
Endo et al.

(10) Patent No.: US 7,673,246 B2
(45) Date of Patent: Mar. 2, 2010

(54) IMAGE INFORMATION PROCESSING APPARATUS AND METHOD, VIRTUAL SPACE PRESENTATION APPARATUS, INFORMATION ADMINISTRATION APPARATUS, AND CONTROL METHODS THEREOF

(75) Inventors: Takaaki Endo, Chiba (JP); Akihiro Katayama, Kanagawa (JP); Masahiro Suzuki, Tokyo (JP); Daisuke Kotake, Kanagawa (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1080 days.

(21) Appl. No.: 10/314,286

(22) Filed: Dec. 9, 2002

(65) Prior Publication Data

US 2003/0107569 A1   Jun. 12, 2003

(30) Foreign Application Priority Data

Dec. 12, 2001 (JP) ............................. 2001-378120
Aug. 5, 2002 (JP) ............................. 2002-228024

(51) Int. Cl.
*G06F 3/00* (2006.01)

(52) U.S. Cl. ..................... 715/757; 715/748; 715/741

(58) Field of Classification Search ................. 715/757
See application file for complete search history.

(56) References Cited

U.S. PATENT DOCUMENTS

| 4,851,897 | A | | 7/1989 | Inuma et al. ................. 358/29 |
| 5,191,644 | A | * | 3/1993 | Takeda ........................ 715/790 |
| 5,255,077 | A | | 10/1993 | Yamazaki et al. ............. 358/29 |
| 6,097,393 | A | * | 8/2000 | Prouty et al. ................ 345/419 |
| 6,335,754 | B1 | | 1/2002 | Endo et al. .................... 348/37 |
| 6,346,938 | B1 | * | 2/2002 | Chan et al. ................... 345/419 |
| 6,366,782 | B1 | * | 4/2002 | Fumarolo et al. ........... 455/457 |
| 6,437,777 | B1 | * | 8/2002 | Kamachi et al. ............ 345/419 |
| 6,449,013 | B1 | | 9/2002 | Suzuki et al. ................ 348/279 |
| 6,452,544 | B1 | * | 9/2002 | Hakala et al. ........... 342/357.13 |

(Continued)

FOREIGN PATENT DOCUMENTS

JP       11-168754       6/1999

OTHER PUBLICATIONS

Ham, TOm, Multicast Spectator Tech for Half-Life,gamespy articles, pp. 1-2.*

(Continued)

*Primary Examiner*—Ryan F Pitaro
(74) *Attorney, Agent, or Firm*—Fitzpatrick, Cella, Harper & Scinto

(57) ABSTRACT

An image information processing apparatus is provided to generate, from previously held image data, a display image according to a viewpoint designated by a user, and to communicate with a control apparatus which can communicate with plural image information processing apparatuses respectively generating display images and has a controller for controlling viewpoint information shared by the plural image information processing apparatuses on the basis of viewpoint information sent from the image information processing apparatus. This apparatus comprises a transmitter to calculate the viewpoint information based on a user's instruction and transmit it to the controller, a receiver to receive from the controller the viewpoint information for generating the display image, and an image generator to read the image data corresponding to the viewpoint information from the previously held image data for generating the display image, and generate and output the display image to a display.

13 Claims, 18 Drawing Sheets

U.S. PATENT DOCUMENTS

| | | | |
|---|---|---|---|
| 6,559,863 B1 * | 5/2003 | Megiddo | 715/753 |
| 6,694,255 B1 * | 2/2004 | Kainuma et al. | 701/209 |
| 6,999,083 B2 * | 2/2006 | Wong et al. | 345/473 |
| 2002/0188678 A1 * | 12/2002 | Edecker et al. | 709/204 |

OTHER PUBLICATIONS

Endo, "Image-Based Cybercities by Using Vehicle-Mounted Cameras," IEICE, pp. 276-277 (1997).

Hirose, "Building Image-Based Cybercities By Using Vehicle-Mounted Cameras (2)—Creating Wide-Range Virtual Environment Taking Into Consideration Cameras and 3D Sensors-", Collected Papers of the Virtual Reality Society of Japan, $2^{nd}$ convention, pp. 67-70 (1997).

* cited by examiner

FIG. 12

| CONTENT ID | CONTENT NAME | DISCRIMINATION INFORMATION OF DATA SERVER |
|---|---|---|
| 1 | ○○ DISTRICT | CCWDS 1, CCWDS 2 |
| 2 | △△ URBAN AREA | CCWDS 2, CCWDS 1 |
| 3 | □□ STREET | CCWDS 3 |
| …… | …… | …… |
| …… | …… | …… |
| …… | …… | …… |

FIG. 13

| USER ID | USER NAME | DISCRIMINATION INFORMATION OF IMAGE INFORMATION PROC APPARATUS | GROUP ID |
|---|---|---|---|
| 1 | ○○ | CCWSender 1 | 3 |
| 2 | △△ | CCWSender 2 | 2 |
| 3 | □□ | CCWSender 3 | 2 |
| …… | …… | …… | …… |
| …… | …… | …… | …… |
| …… | …… | …… | …… |

FIG. 20A

| TURNING POINT ID | COORDINATES | TURNING POINT NAME |
|---|---|---|
| P1 | u1, v1 | ○○ INTERSECTION |
| P2 | u2, v2 | |
| P3 | u3, v3 | |
| P4 | u4, v4 | |
| ... | ... | ... |
| ... | ... | ... |

| ROUTE ID | START TURNING POINT | END TURNING POINT | ROUTE NAME | START FRAME | END FRAME |
|---|---|---|---|---|---|
| R1 | P1 | P2 | ○× STREET | 000001 | 000100 |
| R2 | P2 | P3 | | | |
| R3 | P3 | P4 | | | |
| ... | ... | ... | ... | ... | ... |
| ... | ... | ... | ... | ... | ... |

1010, 1011, 1012, 1013, 1014, 1015, 1016

IMAGE INFORMATION PROCESSING APPARATUS AND METHOD, VIRTUAL SPACE PRESENTATION APPARATUS, INFORMATION ADMINISTRATION APPARATUS, AND CONTROL METHODS THEREOF

BACKGROUND OF THE INVENTION

1. Field of the Invention

The present invention relates to technique by which plural users share the identical space.

2. Related Background Art

An attempt to shoot or photograph a real space by a camera mounted on a movable body such as a vehicle or the like and then represent the shot real space as a virtual space by using a calculator on the basis of real-shot image data obtained has been proposed. For example, "Image-Based Cybercities by Using Vehicle-Mounted Cameras" Endo, Katayama, Tamura, Hirose, Watanabe, Tanikawa (IEICE (Institute of Electronics, Information and Communication Engineers) Societies, PA-3-4, pp. 276-277, 1997), "Building Image-Based Cybercities by Using Vehicle-Mounted Cameras (2)—Creating Wide-Range Virtual Environment Taking Into Consideration Cameras and 3D Sensors" Hirose, Watanabe, Tanikawa, Endo, Katayama, Tamura (Collected Papers of The Virtual Reality Society of Japan, $2^{nd}$ convention, pp. 67-70, 1997), and the like are quoted.

As a method of representing the shot real space as the virtual space on the basis of the real-shot image data obtained by the camera mounted on the movable body, a method of reproducing a geometric model of the real space on the basis of the real-shot image data and then representing the model by using CG (computer graphics) technique is quoted, but this method has the limit in point of, e.g., accuracy, fineness and reality of the model. On one hand, in recent years, IBR (Image-Based Rendering) technique to represent a virtual space by using real-shot image data without reproducing any model has come under the spotlight. Here, the IBR technique is the technique to generate an image which is viewed from an arbitrary viewpoint, on the basis of plural real-shot image data. Since the IBR technique is based on the real-shot image data, it is possible to represent a real virtual space.

In order to build by using the IBR technique a virtual space where a user (experimenter) can walk through (a walk-through operation), it is necessary to generate and present the image according to the position of the user in the virtual space. Thus, in this type of system, each image frame of the real-shot image data is correlated with the position in the virtual space and thus obtained data is stored beforehand, the corresponding image frame is obtained on the basis of the user's position in the virtual space and the direction of user's line of sight, and the obtained image frame is then reproduced.

As a method of obtaining the position data in the real space, it is popular to use a method which utilizes an artificial-satellite positioning system such as GPS (Global Positioning System) used in a car navigation system or the like. Moreover, as a method of correlating position data obtained from the GPS or the like with real-shot image data, a method which uses a time code added to the real-shot image data has been proposed (Japanese Patent Application Laid-Open No. 11-168754). In this method, time data included in the position data is correlated with the time code added to each frame of the real-shot image data, thereby correlating each frame of the real-shot image data with the position data.

In the such like virtual space where the user can walk through, in order to enable the user to view a desired angle at each viewpoint position, it is thought that the image at each viewpoint position is stored beforehand in the form of a panoramic real-shot image capable of covering the range wider than an angle of view at the time of reproduction, and then the partial image to be reproduced is cut out and displayed on the basis of the user's viewpoint position and the direction of user's line of sight in the virtual space.

However, since such a conventional apparatus is independently set, the image corresponding to designated viewpoint information cannot be shared by plural users respectively viewing different screens. In other words, the plural users cannot achieve a real-world quasi-experience at the identical viewpoint.

SUMMARY OF THE INVENTION

The present invention is made in consideration of the foregoing circumstances, and an object thereof is to achieve a real-world quasi-experience at the identical viewpoint by displaying an image of the identical viewpoint on respective display units of plural image generation apparatuses.

Another object of the present invention is to enable plural users to achieve a real-world quasi-experience at the identical viewpoint.

In order to achieve the above object, the present invention is characterized by an image information processing apparatus which generates, from previously held image data, a display image according to a viewpoint designated by a user, wherein the image information processing apparatus communicates with a control apparatus which can communicate with plural image information processing apparatuses respectively generating display images and has a control unit for controlling viewpoint information shared by the plural image information processing apparatuses on the basis of viewpoint information sent from the image information processing apparatus, the image information processing apparatus comprising:

a transmission unit, arranged to calculate the viewpoint information on the basis of a user's instruction and transmit the calculated viewpoint information to the control unit;

a reception unit, arranged to receive from the control unit the viewpoint information for generating the display image; and an image generation unit, arranged to read the image data corresponding to the viewpoint information from the previously held image data for generating the display image, generate the display image, and output the generated display image to a display unit.

Still another object of the present invention is to improve user's convenience in an apparatus by which a space can be shared by plural users.

In order to achieve the above object, the present invention is characterized by an image information processing method in which an image according to viewpoint information indicated by a user is displayed, and which has a sharing mode to display an image according to viewpoint information shared with other image information processing apparatus and an independent mode being a mode to display an image independently of the other image information processing apparatus and being a mode to display the image according to the viewpoint information indicated by the user, the method comprising the steps of:

requesting, in a case where the sharing mode is set, a control right enabling control of the viewpoint information to a control apparatus controlling the shared viewpoint information, in accordance with a user's instruction concerning a control right request; and obtaining, in a case where the independent mode is set, the viewpoint information according to user's handling and displaying the image according to the viewpoint information, without requesting the control right to the control apparatus.

Moreover, in order to achieve the above object, the present invention is characterized by a virtual space presentation apparatus which generates a virtual space image according to a viewpoint position handled by a user, and presents the generated virtual space image to the user, comprising:

a user information obtaining unit, arranged to obtain user information concerning a user sharing an identical virtual space with the user;

a user information image generation unit, arranged to generate a user information image on the basis of the user information; and a display unit, arranged to present, to the user, the user information image together with the virtual space image.

The above and other objects of the present invention will become apparent from the following detailed description based on the attached drawings.

BRIEF DESCRIPTION OF THE DRAWINGS

FIG. 12 is a diagram for explaining a description example of content information according to the fourth embodiment;

FIG. 13 is a diagram for explaining a description example of user information according to the fourth embodiment;

FIG. 20A is a diagram for explaining a description example of turning points according to the fifth embodiment of the present invention;

FIG. 20B is a diagram for explaining a description example of routes according to the fifth embodiment;

DETAILED DESCRIPTION OF THE PREFERRED EMBODIMENTS

Hereinafter, the preferred embodiments of the present invention will be explained with reference to the accompanying drawings.

First Embodiment

An outline of the first embodiment is as follows.

The present embodiment is to provide a system by which plural users can respectively observe and view the identical image on respective display units of mutually different image generation apparatuses and quasi-experience a real world at the identical viewpoint.

Figure 1:
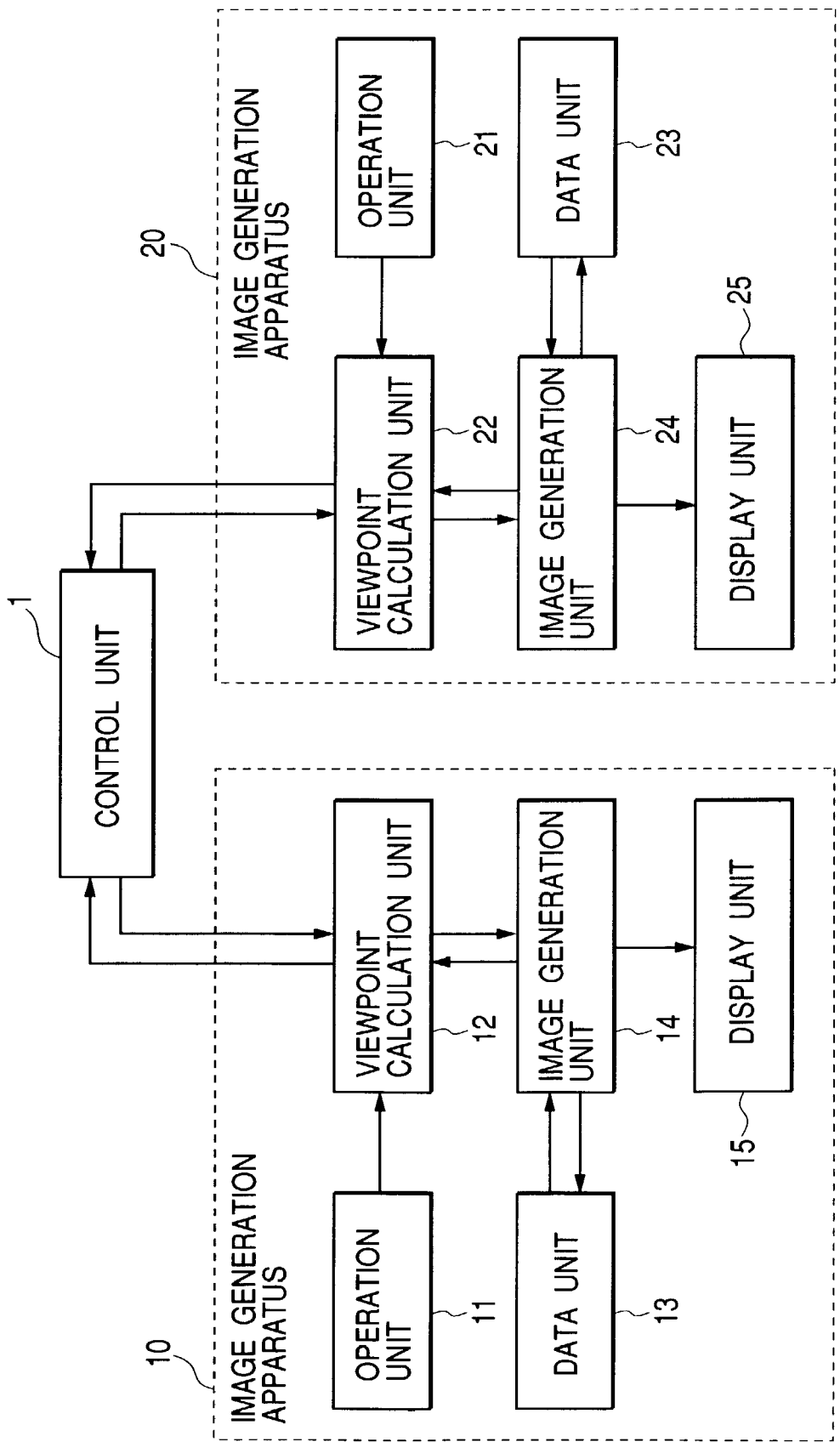
FIG. 1 is a block diagram showing the process according to the first embodiment of the present invention.

FIG. 1 is a block diagram showing the schematic structure of an image presentation system according to the first embodiment. The image presentation system according to the present embodiment is composed of plural image generation apparatuses and a control unit, and the image generation apparatuses are connected to the control unit through a network.

In FIG. 1, numeral 10 denotes an image generation apparatus which includes an operation unit 11, a viewpoint calculation unit 12, a data unit 13, an image generation unit 14 and a display unit 15, and also numeral 20 denotes an image generation apparatus which similarly includes an operation unit 21, a viewpoint calculation unit 22, a data unit 23, an image generation unit 24 and a display unit 25. Here, since the structure of the image generation apparatus 10 is the same as that of the image generation apparatus 20, only the image generation apparatus 10 will be explained hereinafter.

The operation unit 11 which is, e.g., a joystick is manually handled by the user to be able to reflect his intention. By handling the operation unit 11, for example, it is possible to designate a round panoramic image which is the basis for image generation, designate the portion which is to be cut out from the round panoramic image, and send a control right request. For example, a button is provided on the operation unit 11, whereby the control right request is sent by depressing this button. Handling information (or operation information) of the operation unit 11 is sent to the viewpoint calculation unit 12. Incidentally, the operation unit 11 is not limited to the joystick, but may be any apparatus which can designate the round panoramic image being the basis for the image generation (i.e., generation of viewpoint position information), designate the portion cut out from the round panoramic image (i.e., generation of information representing the direction of user's line of sight (simply called line-of-sight direction information hereinafter), and send the control right request, and may be, for example, a mouse, a track ball, a keyboard or the like.

The viewpoint calculation unit 12 calculates viewpoint information representing the position and direction of the viewpoint on the basis of the handling information received from the operation unit 11, and then sends the control right request received from the operation unit 11 and the calculated viewpoint information to a control unit 1. Moreover, the viewpoint calculation unit 12 receives the control right information and the viewpoint information shared in the image presentation system from the control unit 1, and then sends them to the image generation unit 14. Here, in a case where the image generation apparatus 10 holds the control right, it is possible to not send the viewpoint information received from the control unit 1 but send the viewpoint information calculated by the viewpoint calculation unit 12 to the image generation unit 14.

The data unit 13 which consists of a hard disk holds the data to be sent to the image generation unit 14, and sends the data according to a request from the image generation unit 14 to the image generation unit 14. Moreover, the data unit 13 stores panoramic images at one or more points along routes such as roads or the like. Here, it should be noted that each panoramic image may be divided into plural division images and then stored. Incidentally, in addition to the panoramic image, the data unit 13 may store a map image, voice data, text data and the like.

For example, the round panoramic image to be stored in the data unit 13 is generated by synthesizing the images shot along the routes such as the roads or the like by one or more video cameras arranged to be able to shoot all directions, the generated round panoramic image is correlated with position posture information at the shoot position, and then the obtained panoramic image is stored. Incidentally, the data unit 13 is not limited to the hard disk, but may be any medium capable of storing data, such as a tape, a memory or the like.

Figure 2:
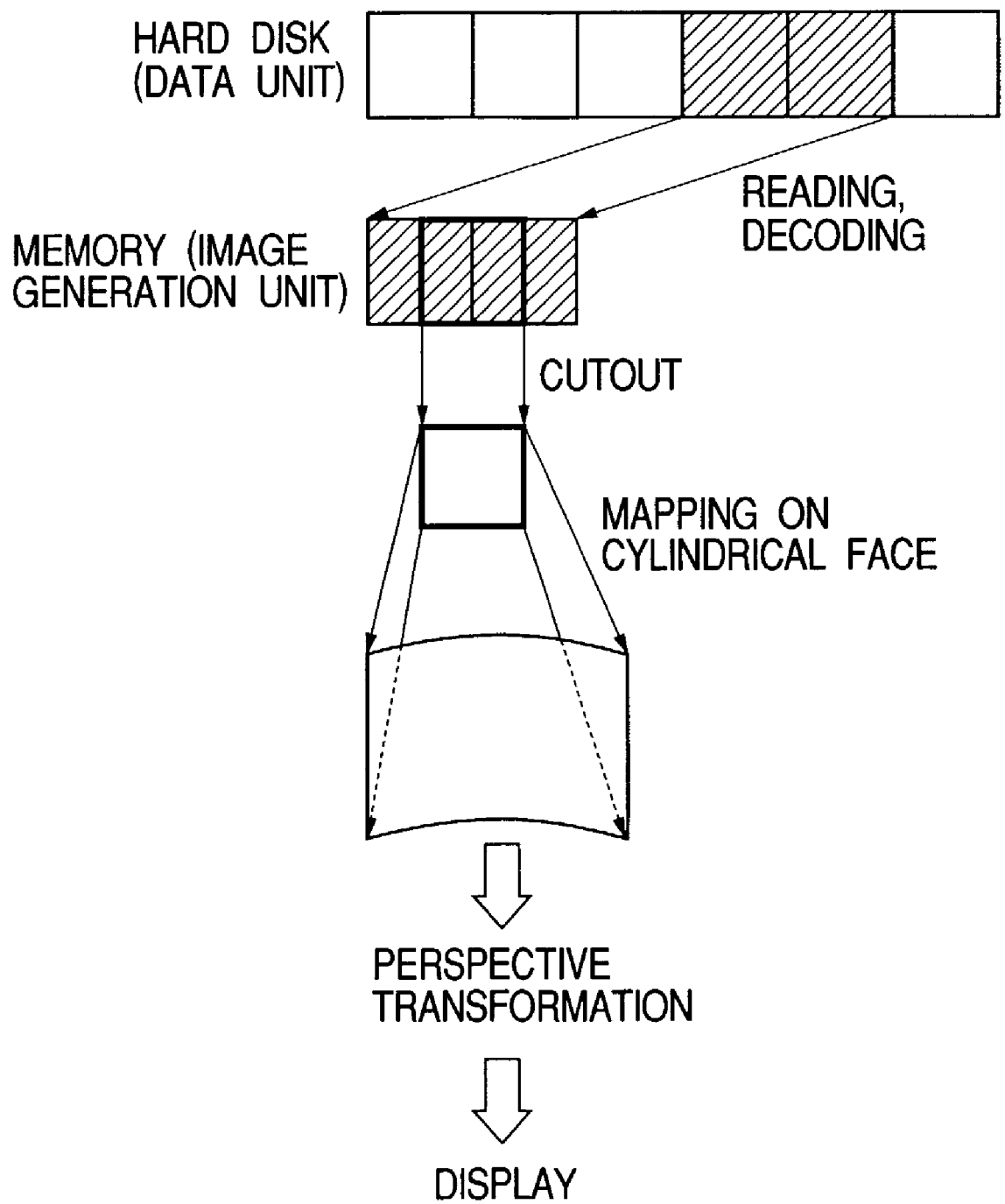
FIG. 2 is a diagram for explaining a method of generating a central projection image according to viewpoint information.

The image generation unit 14 obtains the round panoramic image being the basis of the image generation from the data unit 13 in accordance with the viewpoint information sent from the viewpoint calculation unit 12, generates the image according to the viewpoint information, and displays the generated image on the display unit 15. For example, a process as shown in FIG. 2 is performed in the image generation unit 14.

That is, first, the round panoramic image being the basis of the image generation is obtained from the data unit 13. At this time, only the division image necessary for the image generation may be obtained by using the line-of-sight direction information. Next, the necessary partial image is cut out from the round panoramic image or the division image in accordance with the line-of-sight direction information, and the cut-out partial image is texture mapped on a cylindrical face and then subjected to a perspective transformation process, whereby a central projection image according to the viewpoint information is generated and displayed on the display unit 15.

The display unit 15 which consists of, e.g., a projector and a screen obtains and displays the image generated by the image generation unit 14. Incidentally, the display unit 15 is not limited to the projector and the screen, but may be any medium capable of displaying images, and may be, for example, a CRT or a liquid crystal monitor. Moreover, it is possible to provide the plural display units 15, and in this case, each of the numbers of the image generation units 14 and the data units 13 respectively corresponding to the viewpoint calculation unit 12 is the same as, e.g., the number of the plural display units 15.

The control unit 1 administrates or controls control right information and the viewpoint information given to the viewpoint calculation unit 12 of the image generation apparatus 10 and the viewpoint calculation unit 22 of the image generation apparatus 20. For example, if the user of the image generation apparatus 10 depresses the button provided on the operation unit 11, a control right request is sent to the viewpoint calculation unit 12, and then the control right request and the viewpoint information are sent from the viewpoint calculation unit 12 to the control unit 1. In the control unit 1, an identification number of the image generation apparatus 10 is added to a control right queue. Here, the identification number is allocated beforehand to each image generation apparatus to discriminate each viewpoint calculation unit, and the control right is given to the image generation apparatus which has the headmost identification number of the control right queue. Next, the headmost identification number of the control right queue and the viewpoint information sent from the image generation apparatus corresponding to the headmost identification number are sent to the viewpoint calculation unit of each image generation apparatus.

A not-shown conversation input unit of the image generation apparatus 10 consists of, e.g., a microphone, and conversation information input to the conversion input unit is sent to a not-shown communication unit and then sent to a not-shown conversation output unit of the image generation apparatus 20. Here, the conversation output unit consists of, e.g., a speaker. Similarly, conversation information input to a not-shown conversion input unit of the image generation apparatus 20 is sent to a not-shown communication unit and then sent to a not-shown conversation output unit of the image generation apparatus 10. As a result, conversation between the users becomes possible, whereby it is possible to more smoothly achieve the real-world quasi-experience at the identical viewpoint. Here, it should be noted that the conversation information to be input to the conversation input unit is not limited to voice information, but may be text information. In this case, the conversation input unit consists of, e.g., a keyboard, and the conversation output unit consists of, e.g., a CRT.

Figure 3:
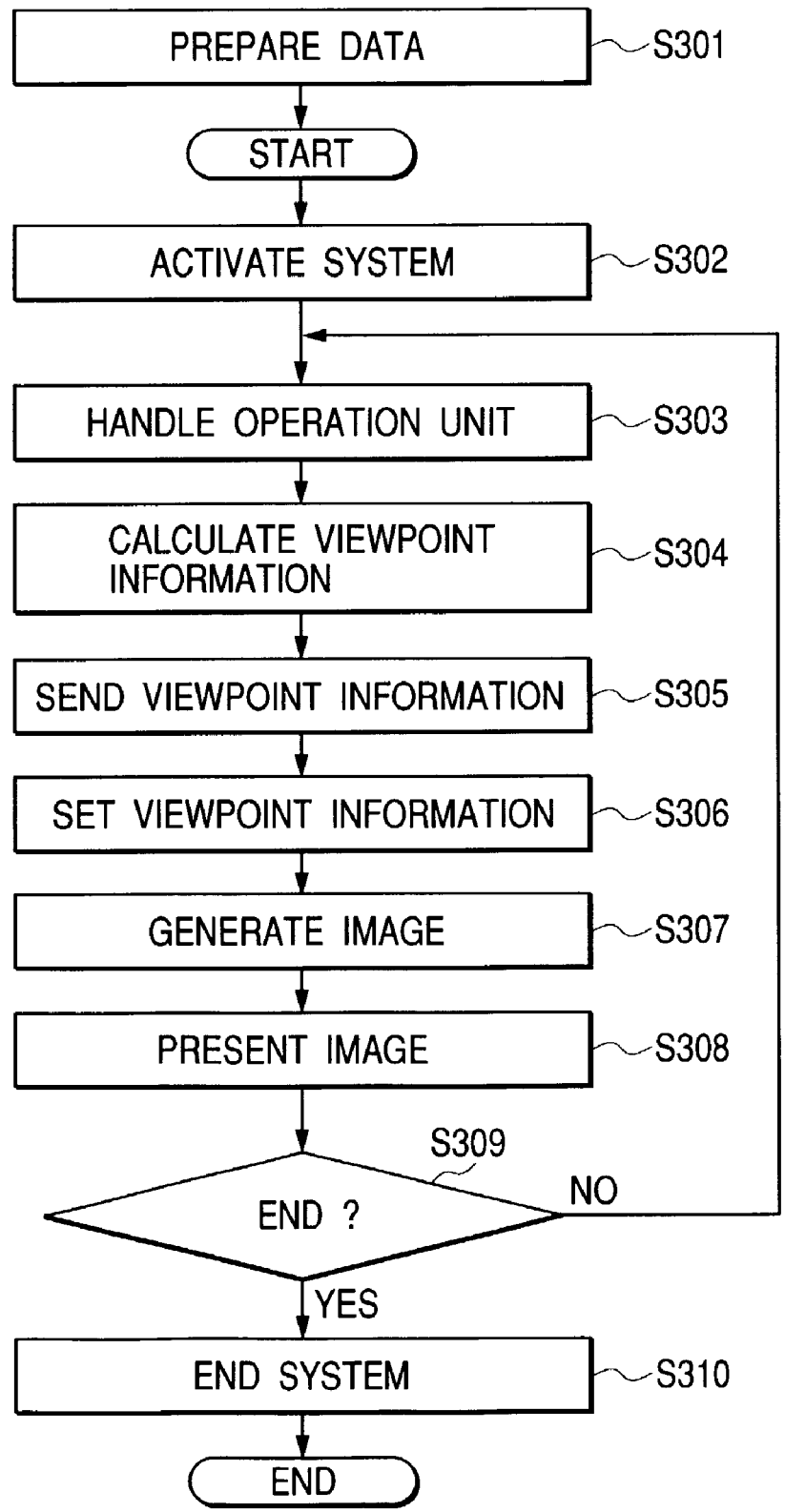
FIG. 3 is a flow chart for explaining a process procedure in an image generation apparatus.

Hereinafter, control of the above structure according to the present embodiment will be explained. FIG. 3 is a flow chart for explaining a process procedure in the image generation apparatus. Here, since the structure of the image generation apparatus 10 is the same as that of the image generation apparatus 20, only the process procedure in the image generation apparatus 10 will be explained hereinafter.

In a step S301, data preparation is performed, that is, the data to be stored in the data unit 13 is prepared. As the data to be prepared, for example, there are the round panoramic image, the text information, the map image, the voice data and the like.

After the data preparation ended, the system is activated in a step S302, and the operation unit 11 is handled in a step S303, whereby the handling information is set to the viewpoint calculation unit 12.

Next, in a step S304, the viewpoint calculation unit 12 calculates the viewpoint information on the basis of the handling information received from the operation unit 11. When the image generation apparatus 10 holds the control right, the viewpoint calculation unit 12 sends the calculated viewpoint information to the control unit 1. Besides, if the button of the control right request provided on the control unit 11 is depressed, the viewpoint calculation unit 12 sends the control right request to the control unit 1.

Next, in a step S305, the viewpoint calculation unit 12 receives the control right information and the viewpoint information from the control unit 1, and sends the received viewpoint information to the image generation unit 14. Incidentally, when the image generation apparatus 10 holds the control right, the viewpoint information to be sent by the viewpoint calculation unit 12 to the image generation unit 14 may not be the viewpoint information sent from the control unit 1 but may be the viewpoint information calculated by the viewpoint calculation unit 12 in the step S304.

Next, in a step S306, the viewpoint information sent from the viewpoint calculation unit 12 is overwritten and set on the viewpoint information held in the image generation unit 14.

Next, in a step S307, the image generation unit 14 obtains the image being the basis of the image generation from the data unit 13, and generates the image according to the viewpoint information.

Moreover, in a step S308, the image generated by the image generation unit 14 is presented (displayed) on the display unit 15.

Then, it is judged in a step S309 whether or not the system should be ended. If judged that the system should be ended, the flow advances to a step S310 to end the system, while if judged that the system should not be ended, the flow returns to the step S303 to repeat the processes in the steps S304 to S308.

Figure 4:
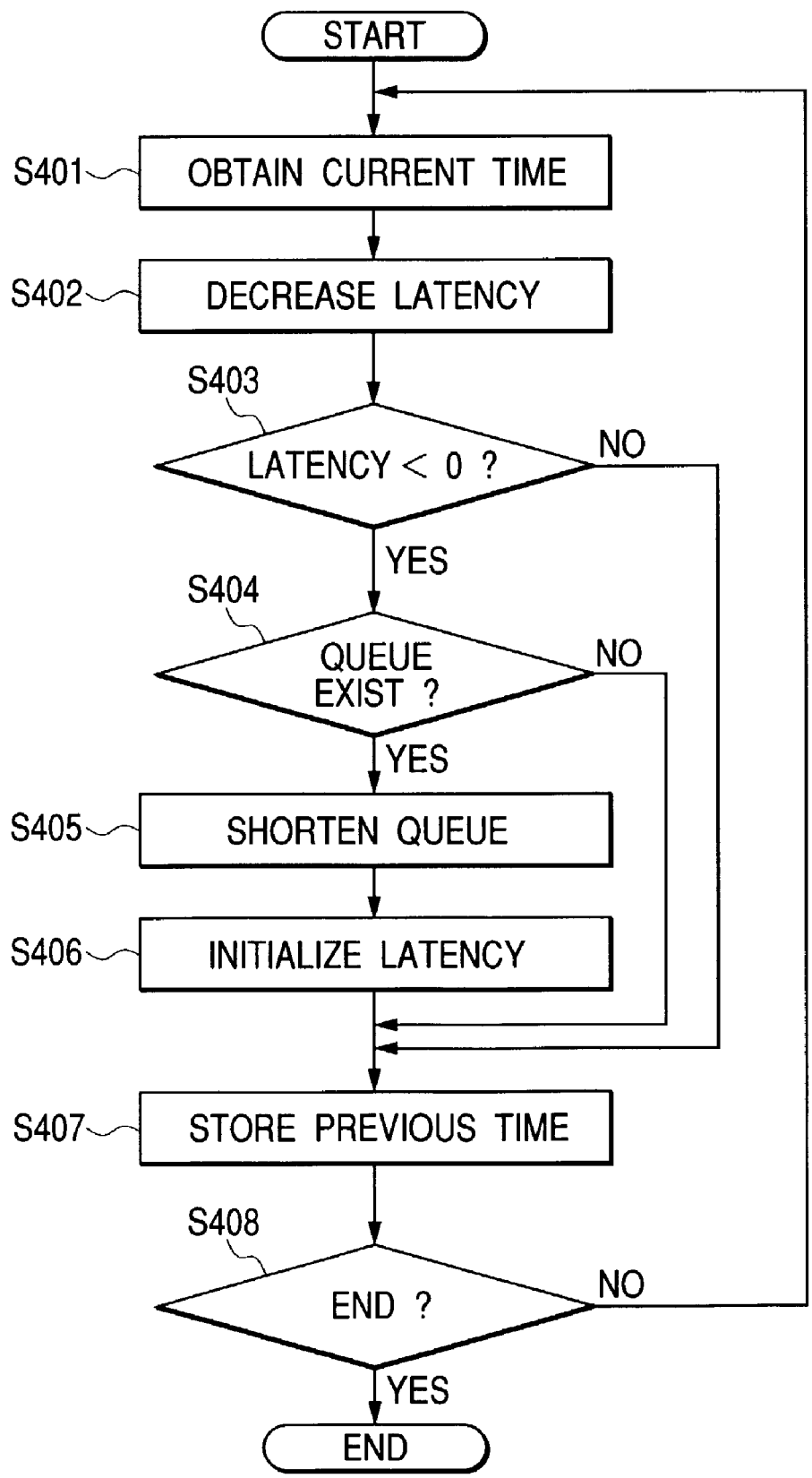
FIG. 4 is a flow chart for explaining a process procedure of a control right queue in a control unit.
Figure 5:
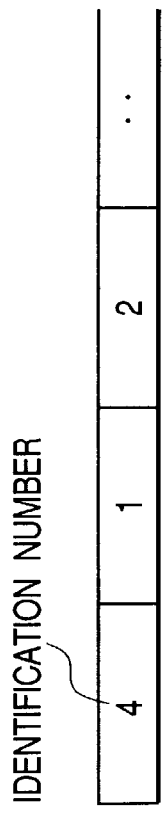
FIG. 5 is a diagram for explaining the control right queue.

Hereinafter, a procedure to process the control right queue in the control unit will be explained with reference to a flow chart shown in FIG. 4. The control right queue has, e.g., an arrangement structure where identification numbers as shown in FIG. 5 are arranged in due order.

First, an initial value is set beforehand as a control right latency (or a control right waiting time), and also identification numbers are respectively allocated beforehand to the plural image generation apparatuses to discriminate each apparatus.

Then, in a step S401, a current time is obtained.

Next, in a step S402, the control right latency is decreased by "current time—previous time". Here, the previous time is to be set in a later-described step S407.

Next, it is judged in a step S403 whether or not the control right latency is smaller than "0". Then, if judged that the control right latency is smaller than "0", the flow advances to a step S404 to further judge whether or not the identification number exists only at the head of the control right queue. Here, it is assumed that the control right is given to only the image generation apparatus having the headmost identification number of the control right queue. In any case, if judged in the step S404 that the identification number exists only at the head of the control right queue, this means that the control right request is sent from only one viewpoint calculation unit, whereby any change operation of the control right queue is not performed.

On the other hand, if judged in the step S404 that the identification number also exists at the position other than the head of the control right queue (i.e., the identification number other than the headmost identification number of the control right queue exists), the flow advances to a step S405. In the step S405, the headmost identification number of the control right queue is deleted, and the secondary identification number and the following identification numbers are moved forward (i.e., the control right queue is shortened as a whole). Then, in a step S406, the control right latency is returned to the initial value, whereby the control right is shifted to the image generation apparatus which had corresponded to the secondary identification number of the control right queue.

Then, in a step S407, the current time obtained in the step S401 is stored as the previous time.

After then, it is judged in a step S408 whether or not the process should be ended. If judged that the process should not be ended, the flow returns to the step S401 to repeat the processes in the steps S402 to S407.

As described above, according to the present embodiment, for example, even if the plural users are respectively away from others, they can achieve the real-world quasi-experience at the identical viewpoint.

Moreover, since the system is structured to generate the image according to the viewpoint information at each terminal (image generation apparatus), it is possible to decrease a data amount necessary for performing communication between the control unit and the image generation apparatus. Thus, it is possible to smoothly change the display image in accordance with user's handling.

Figure 6:
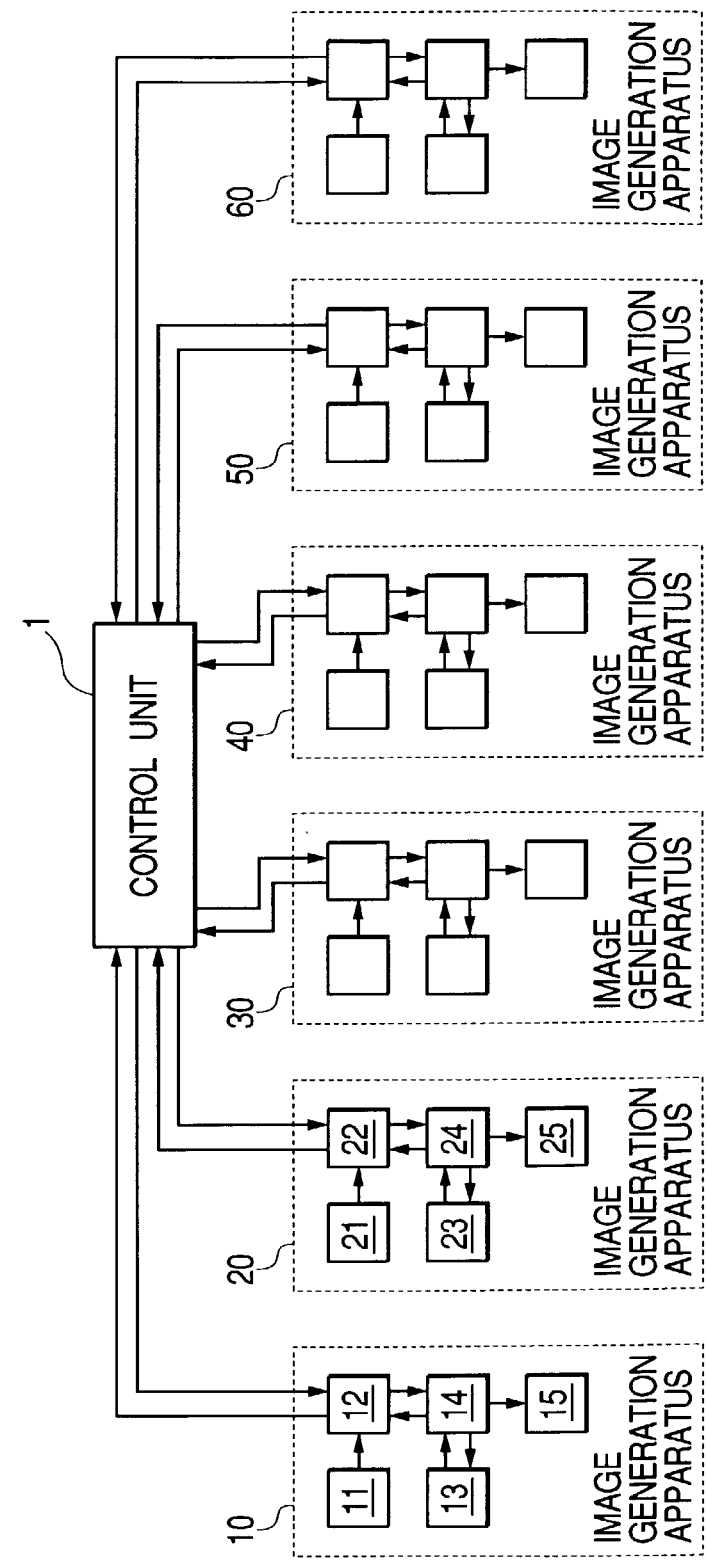
FIG. 6 is a block diagram for explaining a case where there are image generation apparatuses of an arbitrary number.

Here, although the present embodiment shows the case where the two image generation apparatuses are provided, the present invention is not limited to this. That is, as shown in FIG. 6, image generation apparatuses of an arbitrary number may be provided (six image generation apparatuses 10, 20, 30, 40, 50 and 60 are provided in FIG. 6).

Moreover, the control right may be obtained immediately after the control right request is sent by handling the operation unit 11. For example, in a case where users of a number equal to or smaller than a predetermined number participate in, the control right may be obtained without latency. The process at this time is substantially the same as that shown in the flow chart of FIG. 4 if the initial value for the control right latency is set to "0".

Although the control right can be requested from all the image generation apparatuses in the present embodiment, it is possible to limit the image generation apparatus capable of requesting the control right. In this case, the image generation apparatus incapable of requesting the control right can display the image at the identical viewpoint but can not indicate the viewpoint information. For example, such a structure is effective in a case where users of a number larger than a predetermined number participate in.

Second Embodiment

The image presentation system by which the plural users can share the image based on the identical viewpoint was explained in the first embodiment. On one hand, in the second embodiment, an image presentation system which includes, in addition to the sharing mode explained in the first embodiment that the plural users share the image based on the identical viewpoint, an independent mode that plural users respectively view images based on independent viewpoints will be explained.

Here, since the structure of the image presentation system according to the present embodiment is the same as that already explained in the first embodiment, the explanation thereof will be omitted.

Figure 7:
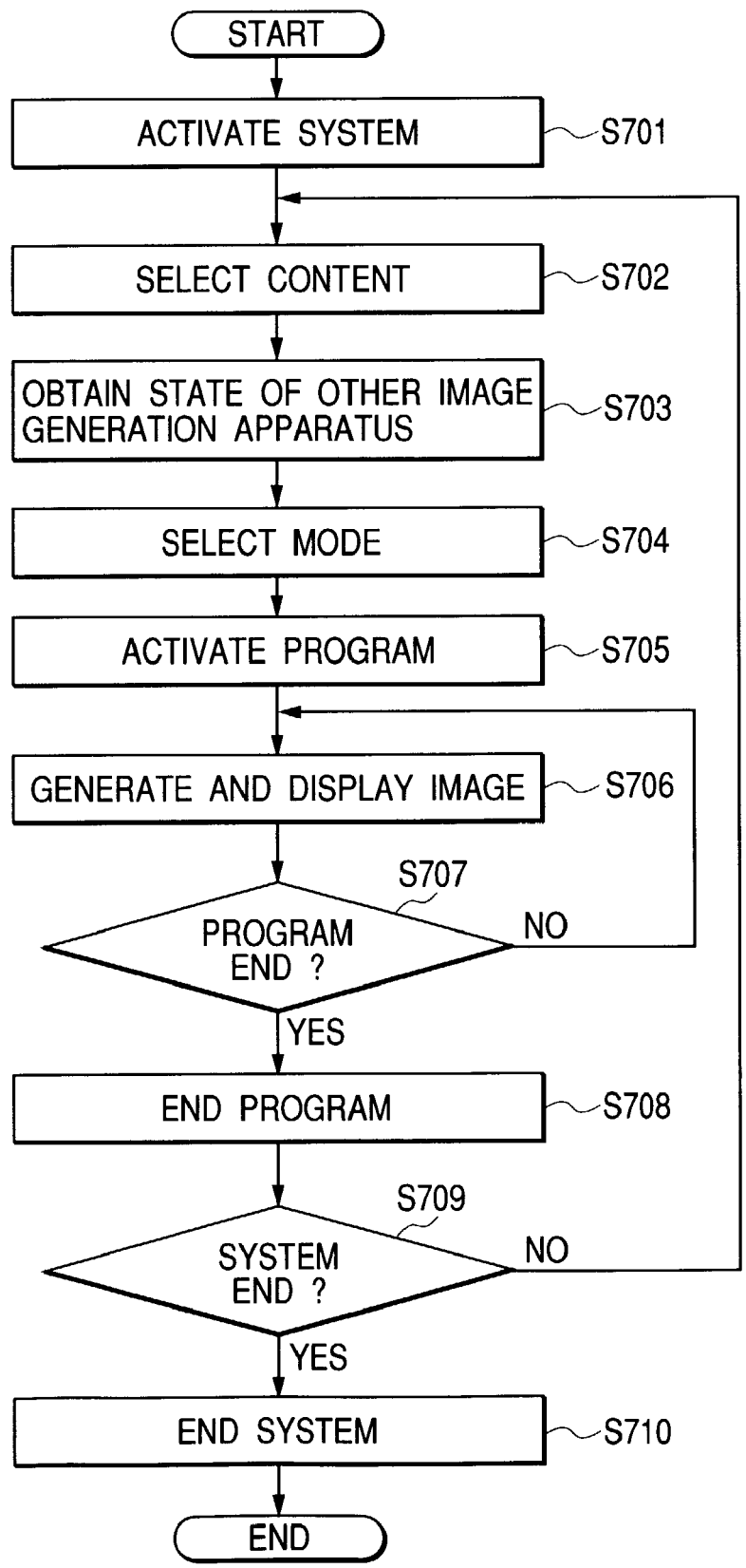
FIG. 7 is a flow chart for explaining a process procedure to select contents and modes in an image generation apparatus, according to the second embodiment of the present invention.

FIG. 7 is a flow chart for explaining a process procedure to select contents and the modes in the image generation apparatus. Here, since the structure of an image generation apparatus 10 is the same as that of an image generation apparatus 20, only the image generation apparatus 10 will be explained hereinafter.

First, the image presentation system is activated in a step S701, and then an image generation unit 14 displays a content selection screen on a display unit 15 in a step S702. Thus, a user selects a desired content by handling, e.g., a not-shown operation unit connected to the image generation unit 14. Then, the selected content information is sent to a viewpoint calculation unit 12.

Next, in a step S703, the viewpoint calculation unit 12 obtains the state of the image generation apparatus 20 from a control unit 1, and sends the obtained state information to the image generation unit 14.

Figure 8:
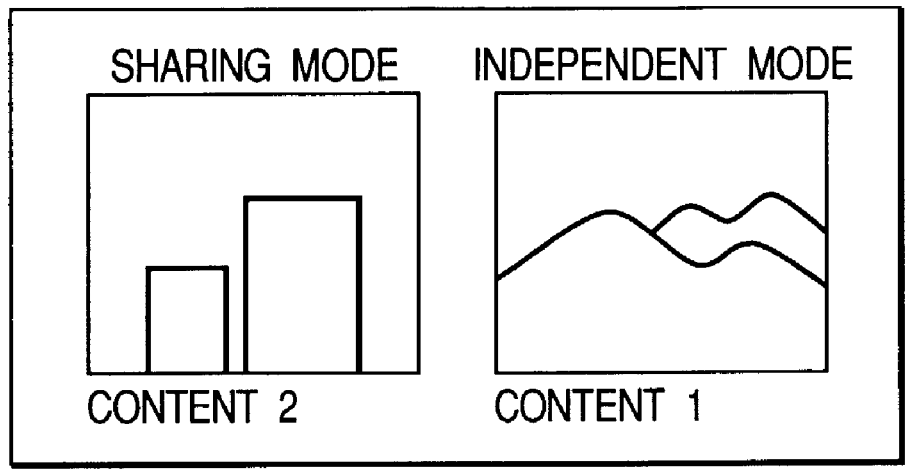
FIG. 8 is a diagram for explaining an example of a mode selection screen.
Figure 9:
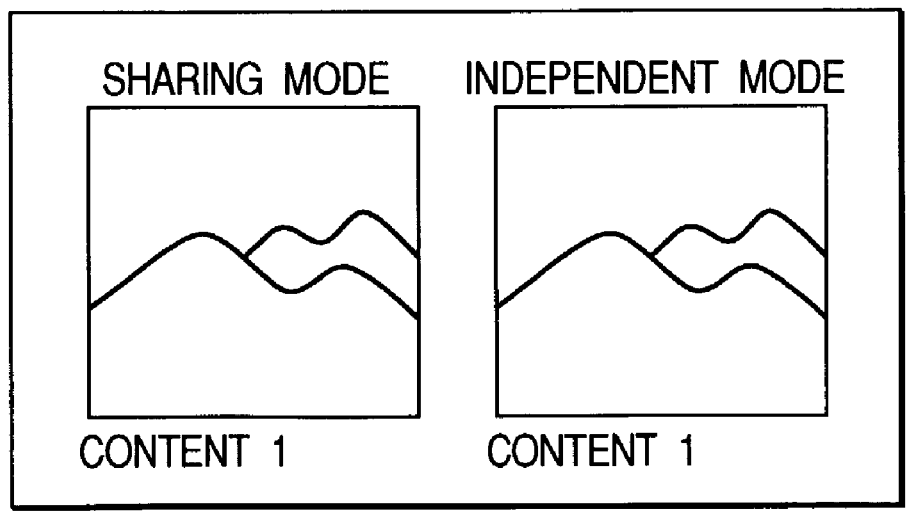
FIG. 9 is a diagram for explaining another example of the mode selection screen.

Then, in a step S704, the image generation unit 14 displays a mode selection screen on the display unit 15 on the basis of the state of the image generation apparatus 20, whereby the user can select the desired mode by handling, e.g., the not-shown operation unit connected to the image generation unit 14. For example, in a case where the content selected by the image generation apparatus 20 is different from the content selected in the step S702 and the mode selected by the image generation apparatus 20 is the sharing mode, a mode selection screen as shown in FIG. 8 is displayed. In other case, a mode selection screen as shown in FIG. 9 is displayed.

Next, in a step S705, the image generation unit 14 activates a program to perform the image generation according to the selected mode. Here, if the sharing mode is selected on the mode selection screen shown in FIG. 8, the content selected in the step S702 is not selected but the content selected by the image generation apparatus 20 is selected.

Further, in a step S706, the image generation unit 14 obtains the image being the basis of the image generation from a data unit 13, generates an actual image, and then displays the generated image on the display unit 15.

Then, it is judged in a step S707 whether or not the program should be ended. If judged that the program should be ended, the flow advances to a step S708 to end the program, while if judged that the program should not be ended, the flow returns to the step S706 to again perform the image generation and display.

After then, it is further judged in a step S709 whether or not the system should be ended. If judged that the system should be ended, the flow advances to a step S710 to end the system, while if judged that the system should not be ended, the flow returns to the step S702 to repeat the processes in the steps S703 to S708.

As described above, according to the second embodiment, when the user participates in the system, he can select the desired content and further select whether he performs the real-world quasi-experience at the identical viewpoint together with other user or at the viewpoint different from other user's viewpoint.

Here, although the present embodiment shows the case where the two image generation apparatuses are provided, the present invention is not limited to this. That is, as shown in FIG. 6, image generation apparatuses of an arbitrary number may be provided.

In the second embodiment, although it is selected whether both viewpoint position information and line-of-sight direction information of the user should be set to be the same as those of other user or set to be different from those of other user, the present invention is not limited to this. That is, it is possible to moreover provide a mode capable of selecting that only the viewpoint position information of the user should be set to be the same as that of other user but the line-of-sight direction information of the user should be set to be different from that of other user. In this case, the viewpoint position of the user is the same as that of the user of the other image generation apparatus, but the line-of-sight direction can be freely selected.

Such a modification can be achieved by changing the process to be performed in the viewpoint calculation unit of the image generation apparatus as follows.

That is, with respect to viewpoint information which includes the viewpoint position information and the line-of-sight direction information sent from the control unit, the viewpoint calculation unit of the image generation apparatus changes the line-of-sight direction information according to an instruction input from an operation unit when this instruction concerns the line-of-sight direction information. Then, the viewpoint calculation unit outputs the viewpoint position information sent from the control unit and the line-of-sight direction information according to the instruction from the operation unit to the image generation unit.

Moreover, although it is necessary to once end the program to change the sharing method in the second embodiment, the present invention is not limited to this. That is, the sharing method may be changed without ending the program.

For example, when the user capable of obtaining the control right does not hold the control right, he may view other image by using the independent mode so as to be able to perform the real-world quasi-experience at other viewpoint.

Here, the sharing method consists of, for example, a method of setting both the viewpoint position information and the line-of-sight direction information of the user to be the same as those of the user of other image generation apparatus, a method of setting only the viewpoint position information to be the same as that of the user of other image generation apparatus, a method of setting both the viewpoint position information and the line-of-sight direction information of the user to be different from those of the user of other image generation apparatus, and the like.

Third Embodiment

Although the identical image is displayed on the display units of all the image generation apparatuses in each of the above embodiments, the present invention is not limited to this. That is, it is possible to display an identical image only a part of image generation apparatuses in an image presentation system.

Figure 10:
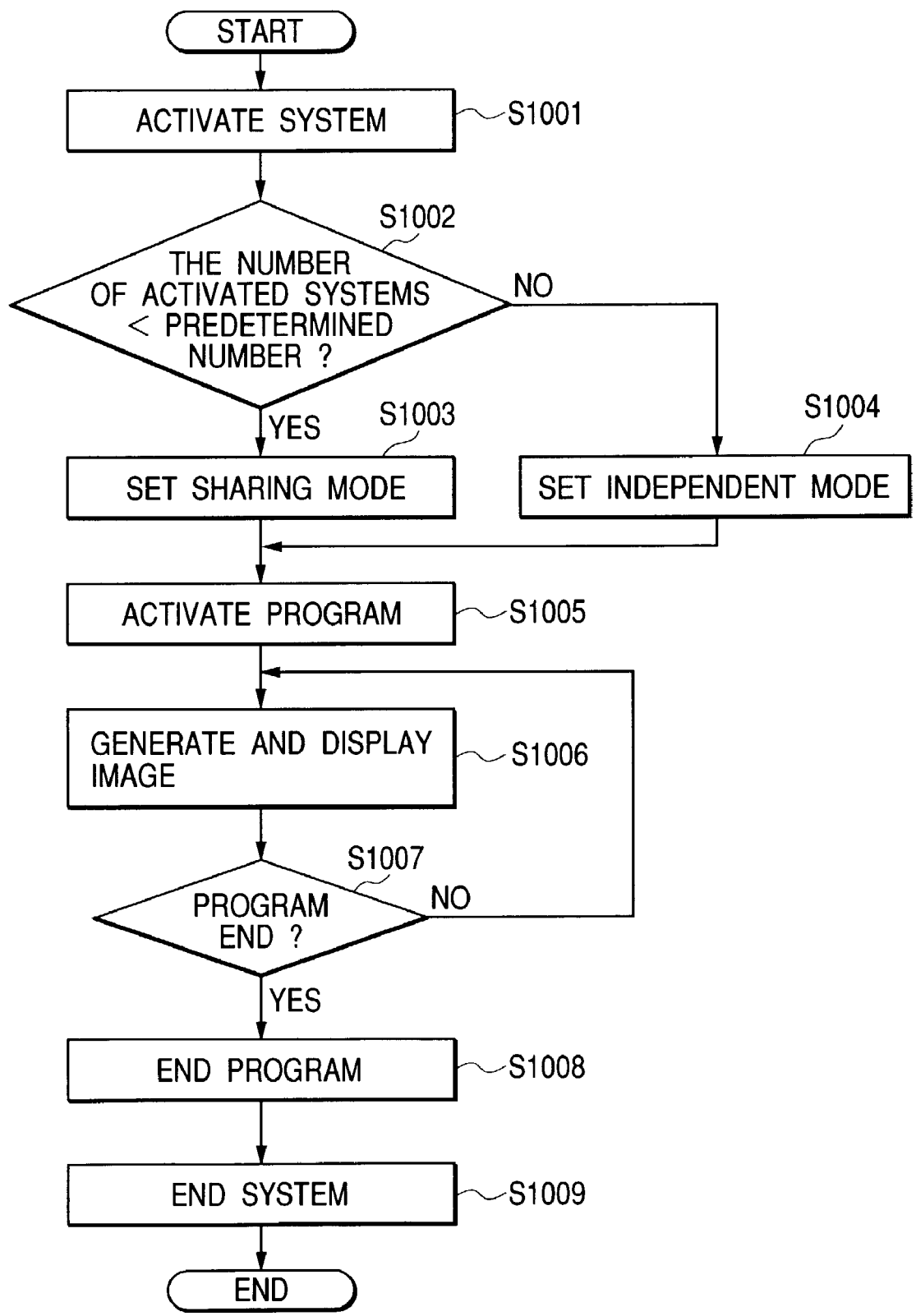
FIG. 10 is a flow chart for explaining a process procedure according to the third embodiment of the present invention.

Hereinafter, a method of limiting the number of users capable of obtaining a control right will be explained with reference to a flow chart shown in FIG. 10.

For example, a case where an image generation apparatus 30 is activated in the state that image generation apparatuses 10 and 20 have been already activated in an image presentation system as shown in FIG. 6 will be explained. Here, it is assumed that a control unit of the image generation apparatus has been already activated.

First, in a step S1001, the system of the image generation apparatus 30 is activated.

Then, in a step S1002, a control unit 1 compares the number of the image generation apparatuses already activated with a predetermined number. If the number of the image generation apparatuses already activated is smaller than the predetermined number, the flow advances to a step S1003 to set a program activation mode to a sharing mode. For example, if the predetermined number is "4", since the number of the image generation apparatuses already activated in the present embodiment is "3", the sharing mode is set for the image generation apparatus 30. Here, since the image generation apparatus 30 can obtain the control right in this mode, the user of this apparatus can perform a real-world quasi-experience at the identical viewpoint together with the users of other image generation apparatuses.

On the other hand, if the number of the image generation apparatuses already activated is the same or larger than the predetermined number, the flow advances to a step S1004 to set the program activation mode to an independent mode. For example, if the predetermined number is "3", the independent mode is set for the image generation apparatus 30. Here, since the image generation apparatus 30 can not obtain the control right in this mode, the user of this apparatus can perform the real-world quasi-experience at the viewpoint different from the users of other image generation apparatuses.

Then, in a step S1005, the image generation apparatus 30 activates a program to perform image generation and presentation in accordance with the selected mode, thereby performing the image generation and presentation in a step S1006.

After then, it is judged in a step S1007 whether or not the program should be ended. If judged that the program should be ended, the flow advances to a step S1008 to end the program, while if judged that the program should not be ended, the flow returns to the step S1006 to again perform the image generation and presentation.

Finally, the system is ended in a step S1009.

Incidentally, the number of the users capable of obtaining the control right may be changed during the image generation and presentation.

As described above, according to the third embodiment, by limiting the number of the users capable of obtaining the control right, it is possible to shorten a time until the control right is obtained and to prolong a time that the control right is being held.

Fourth Embodiment

The fourth embodiment is characterized by causing users to be able to easily change a sharing group by displaying shared information in a walk-through within a virtual space.

Figure 11:
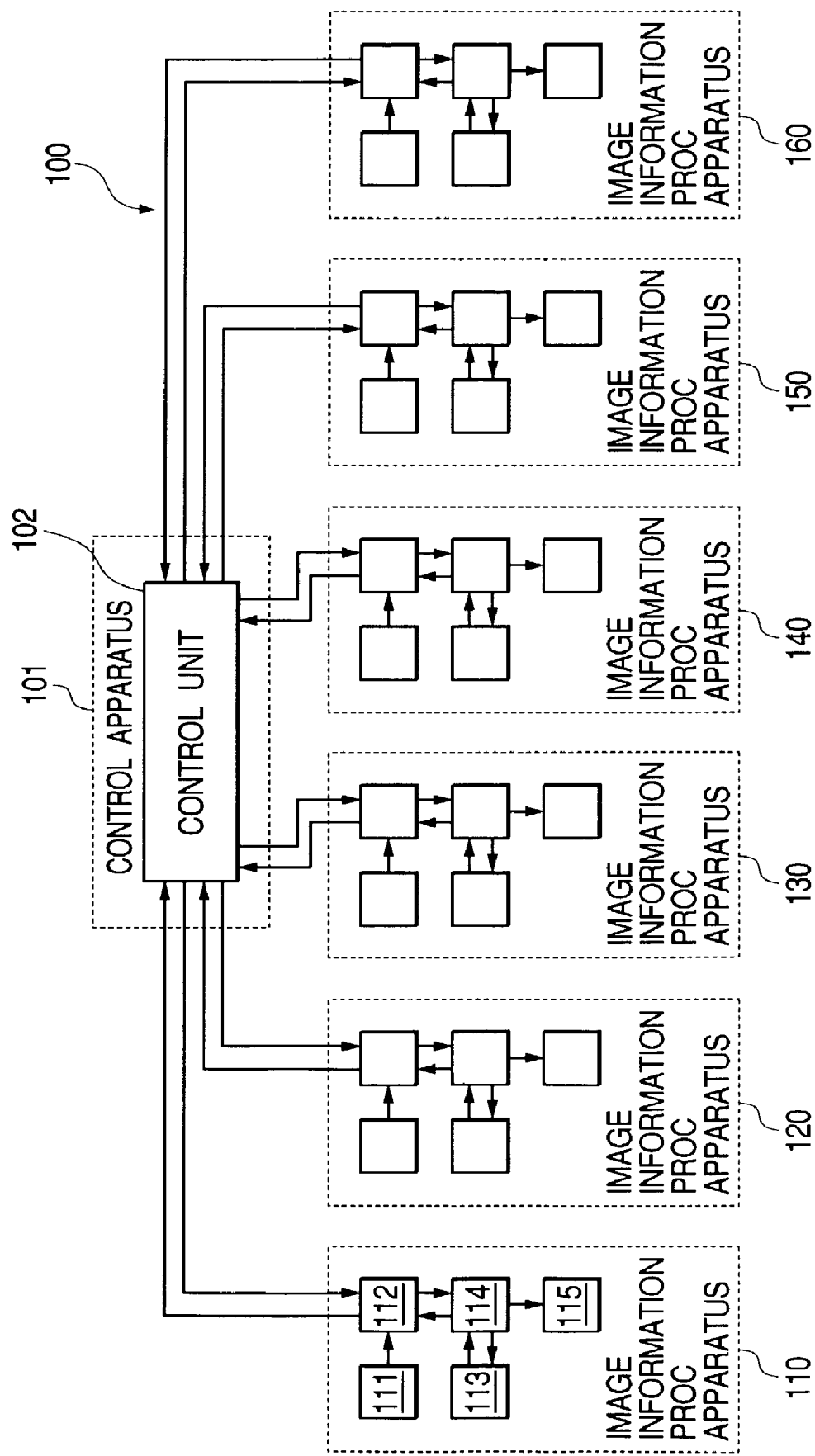
FIG. 11 is a block diagram showing the schematic structure of an information processing apparatus according to the fourth embodiment of the present invention.

FIG. 11 is a block diagram showing the schematic structure of a virtual space presentation system according to the present embodiment. In FIG. 11, a virtual space presentation system 100 consists of a control apparatus 101 acting as an information administration apparatus and six image processing apparatuses 110, 120, 130, 140, 150 and 160 acting as virtual space presentation apparatuses.

The control apparatus 101 includes a control unit 102 to which the image information processing apparatuses 110 to 160 are connected respectively, and the control unit 102 administrates content information, user information, shared information and the like. The user information, the shared information and the like administrated by the control unit 102 are supplied to each image information processing apparatus in response to a request sent from the image information processing apparatus, and appropriately changed in response to a request sent from each image information processing apparatus. Here, it is assumed that, throughout the present application, "content" indicates a real world which can be achieved through a quasi-experience.

FIG. 12 is a diagram for explaining a description example of the content information. In a content list 200 as shown in FIG. 12, a specific content ID 201, a content name 202, and discrimination information 203 of a data server (not shown) holding content data are described for each content.

FIG. 13 is a diagram for explaining a description example of the user information. In a user list 300 as shown in FIG. 13, a specific user ID 301, a user name 302, discrimination information 303 of the used image information processing apparatus, and a group ID 304 for identifying a group of user are described for each user. Here, it is assumed that the group indicates an assemblage of the users of the image information processing apparatuses respectively including display units on which the identical image is displayed.

Figure 14:
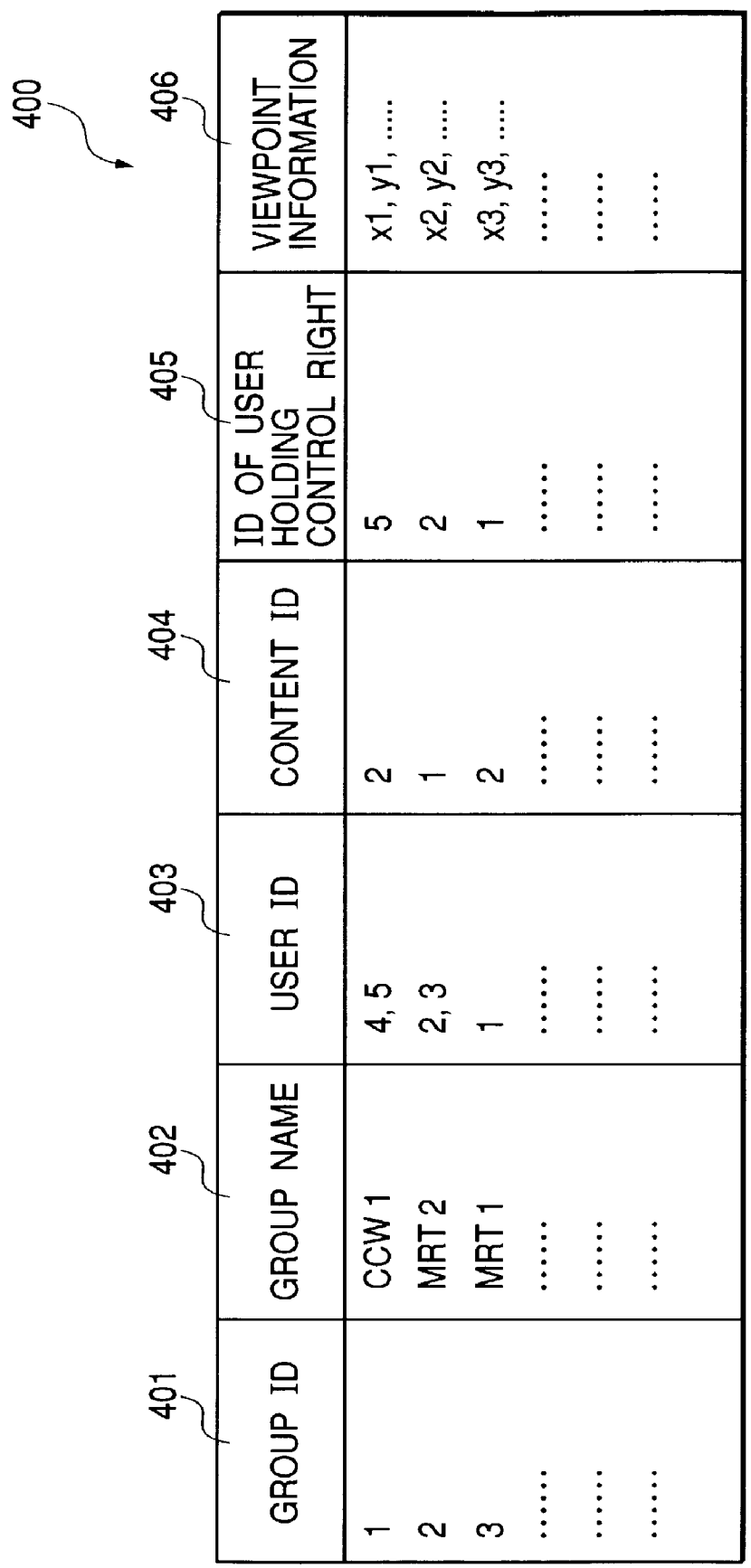
FIG. 14 is a diagram for explaining a description example of shared information according to the fourth embodiment.

FIG. 14 is a diagram for explaining a description example of the shared information. In a group list 400 as shown in FIG. 14, a specific group ID 401, a group name 402, a group user ID 403, a content ID 404 of the content used by the group, a user ID 405 of the user holding a control right, and viewpoint information (viewpoint position and direction) 406 are described for each group.

Figure 15:
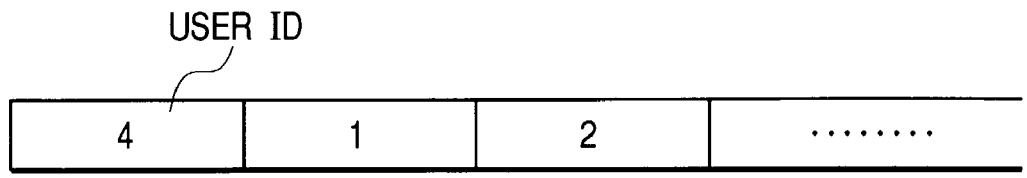
FIG. 15 is a diagram for explaining an example of a control right queue according to the fourth embodiment.

Here, it should be noted that the control right of each group is administrated by, e.g., a control right latency and a control right queue as shown in FIG. 15. For example, if the user of the image information processing apparatus 110 depresses a button which is provided on an operation unit 111 and acts as a control right request instruction input apparatus, a control right request is sent to a calculation unit 112, and the control right request and a viewpoint setting request are further sent from the calculation unit 112 to the control unit 102. Then, the control unit 102 adds the user ID of the user of the image information processing apparatus 110 to the tag end of the control right queue of the group to which the user of the image information processing apparatus 110 belongs.

Here, the user ID 405 of the user having the right capable of performing, on behalf of the group, various controls such as change of the viewpoint position and direction experienced in common by the users belonging to this group, change of the group to other group, determination of the mode change and the like is the user ID at the head of the control right queue. In a case where the plural user ID's are included in the control right queue, the user ID at the head of the control right queue is deleted after elapsing a predetermined control right latency, and the second and following user ID's of the control right queue are sequentially moved forward. Here, by setting the control right latency to "0", it is possible to be able to obtain the control right immediately when the control right request is sent by handling the operation unit 111. Moreover, as described later, the user having the control right can actively abandon this right and give it to the designated other user.

The image information processing apparatus 110 includes the operation unit 111, the calculation unit 112, a data unit 113, an image generation unit 114 and a display unit 115. Here, since the structures of the image information processing apparatuses 120 to 160 are the same as that of the image information processing apparatus 110, only the image information processing apparatus 110 will be explained hereinafter.

The operation unit 111 consists of buttons and an input unit suitable for indicating directions (e.g., a mouse, a joystick, a track ball, a touch panel or the like). The operation unit 111 is manually handled by the user to be able to reflect his intention. For example, the user handles the operation unit 111 based on the displayed contents as viewing the display unit 115. Thus, by handling the operation unit 111, it is possible to designate a panoramic real-shot image being the basis for the display image generation, designate the portion cut out and displayed from the designated panoramic real-shot image, send a control right request, send a shared information request, select a sharing group, and the like.

As described above, the button provided on the operation unit 111 is used to send the control right request. Moreover, the shared information request is sent by depressing the other button on the operation unit 111, and the handling information of the operation unit 111 is sent to the calculation unit 112. Incidentally, an input device such as a keyboard or the like may be provided on the operation unit 111, and a combination of plural inputs from the input device of the operation unit 111 may be allocated to one handling.

Besides, a mode shift button may be provided on the operation unit 111 to quickly shift a sharing mode to an independent mode or conversely the independent mode to the sharing mode (i.e., creating a new group to which only one user belongs).

The calculation unit 112 performs a process according to the selected mode, the state of the control right and the like. Here, the mode includes, e.g., the sharing mode and the independent mode, and is administrated by the calculation unit 112. In the sharing mode, the user quasi-experiences a real world at the identical viewpoint together with the user of the other image information processing apparatus, while in the independent mode, the user quasi-experiences the real world at the different viewpoint from the user of the other image information processing apparatus. If the sharing group selection information is sent from the operation unit 111, the calculation unit 112 changes the administrated mode according to need, and sends the administrated sharing group selection information to the control unit 102.

When the mode administrated by the calculation unit 112 is the independent mode, it is possible to reduce a load to the control unit 102 by not administrating the information concerning the user of the image information processing apparatus 110 on the user list 300 administrated by the control unit 102.

Incidentally, when the mode administrated by the calculation unit 112 is the independent mode, it is possible to set that the user quasi-experiences the real world at the identical viewpoint together with the users of the other several image information processing apparatuses but does not share the image with the other users.

When the sharing mode is selected and the control right is given, the calculation unit 112 sends the viewpoint information calculated based on the handling information received from the operation unit 111, to the image generation unit 114. On the other hand, when the sharing mode is selected and the control right is not given, the calculation unit 112 sends the viewpoint information received from the control unit 102 to the image generation unit 114. Further, when the control right request is received from the operation unit 111, the calculation unit 112 sends the control right request to the control unit 102. Furthermore, when the independent mode is selected, the calculation unit 112 sends the viewpoint information calculated based on the handling information received from the operation unit 111 to the image generation unit 114.

Besides, when the shared information request is received from the operation unit 111, the calculation unit 112 sends the shared information request to the control unit 102 and sends the shared information received from the control unit 102 to the image generation unit 114, irrespective of the selected mode. Here, it should be noted that the calculation unit 112 may receive the shared information from the control unit 102 even if the shared information request is not received from the operation unit 111.

The data unit 113 includes, e.g., a hard disk and thus holds the data sent to the image generation unit 114. Further, the data unit 113 sends the data according to a request from the image generation unit 114 to the image generation unit 114, and obtains beforehand a part or all of specific content data from the data server corresponding to the content through a not-shown communication line or the like. The content data includes data representing a panoramic real-shot image at one or more points along a route such as a road or the like (each panoramic real-shot image may be divided into plural division images and then stored), data concerning a date, a time, a position and a posture, map image data, voice data, and the like. For example, the panoramic real-shot image included in the content data is obtained by synthesizing images shot along the route such as the road or the like with use of one or more video cameras arranged to be able to shoot all directions, and the obtained panoramic real-shot image is correlated with the position information at the shoot position and the posture information at the shoot time. Incidentally, the data unit 113 is not limited to the hard disk, but may be any medium capable of holding data. For example, a medium of arbitrary storage system such as a magnetic recording medium, an optical (magnetooptical) recording medium, a semiconductor storage medium or the like may be used as well as a medium of arbitrary shape such as a tape medium, a disk medium, a card medium or the like.

Incidentally, the data to be sent to the image generation unit 114 may be stored in a not-shown data server, instead of the data unit 113 of the image generation apparatus 110, so that the stored data can be obtained from the data server according to need.

Figure 16:
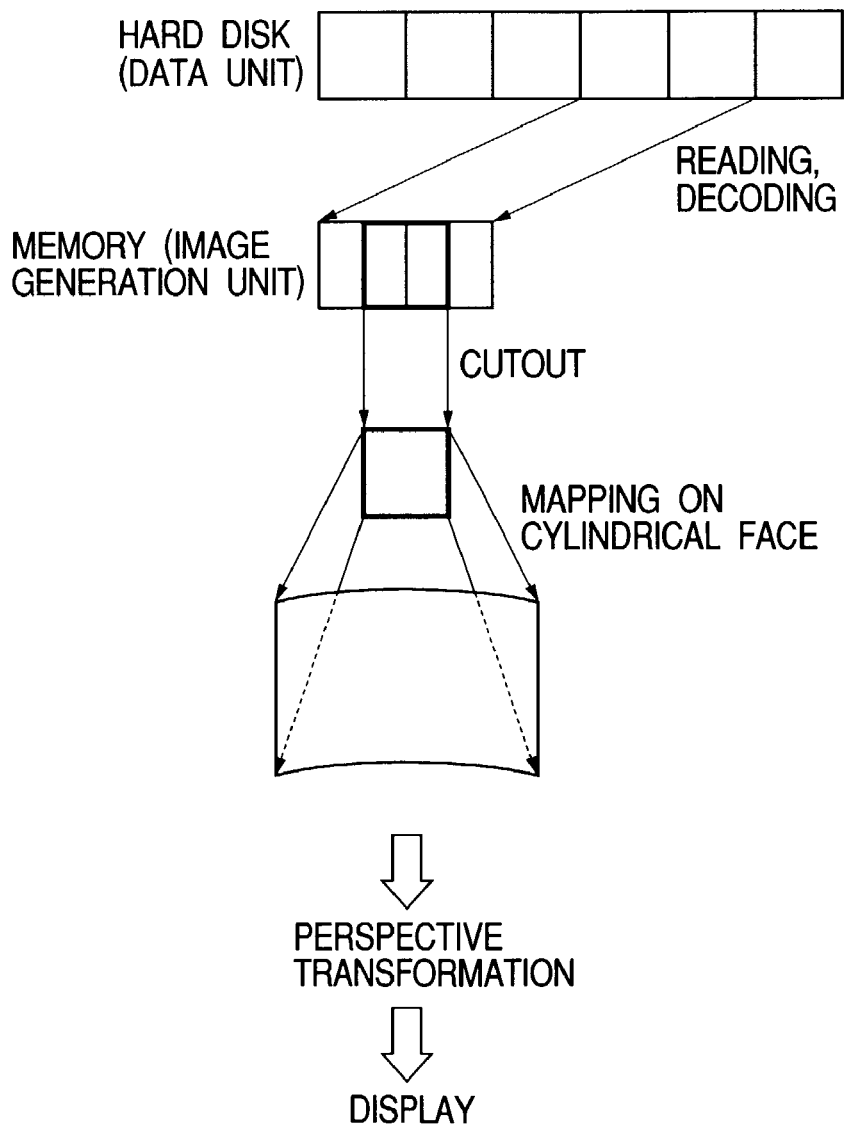
FIG. 16 is a diagram for explaining a process procedure to generate a display image from a panoramic real-shot image, according to the fourth embodiment.

The image generation unit 114 obtains the panoramic real-shot image being the basis of the image generation from the data unit 113 in accordance with the viewpoint information (e.g., representing a viewpoint position and a line-of-sight direction) sent from the calculation unit 112, generates the image according to the obtained viewpoint information, and then displays the generated image on the display unit 115. For example, a process as shown in FIG. 16 is performed in the image generation unit 114. That is, first, the panoramic real-shot image being the basis of the image generation is obtained from the data unit 113. At this time, only the division image necessary for the image generation may be obtained by using the line-of-sight direction information. Next, the necessary partial image is cut out from the panoramic real-shot image or the division image in accordance with the line-of-sight direction information, and the cut-out partial image is texture mapped on a cylindrical face and then subjected to a perspective transformation process, whereby a central projection image according to the viewpoint information is generated.

Moreover, when the shared information is sent from the calculation unit 112, the image generation unit 114 extracts the necessary information from the sent shared information, superposes the extracted information on the above generated image, and then sends the obtained image to the display unit 115.

For example, if a list of the names of the users belonging to a group to which the user in question belongs is superposed on the generated image and displayed on the display unit 115, it is possible for the user in question to easily discriminate other users belonging to this group. Moreover, if the name of the user holding the control right is displayed with an attribute such as a different color, it is possible to easily discriminate the user holding the control right. Moreover, it is also possible to display the name of only the user holding the control right. Here, the list of the user's names may not be superposed on the generated image, but instead may be displayed on the display unit 115 in the form of a different window.

Figure 17:
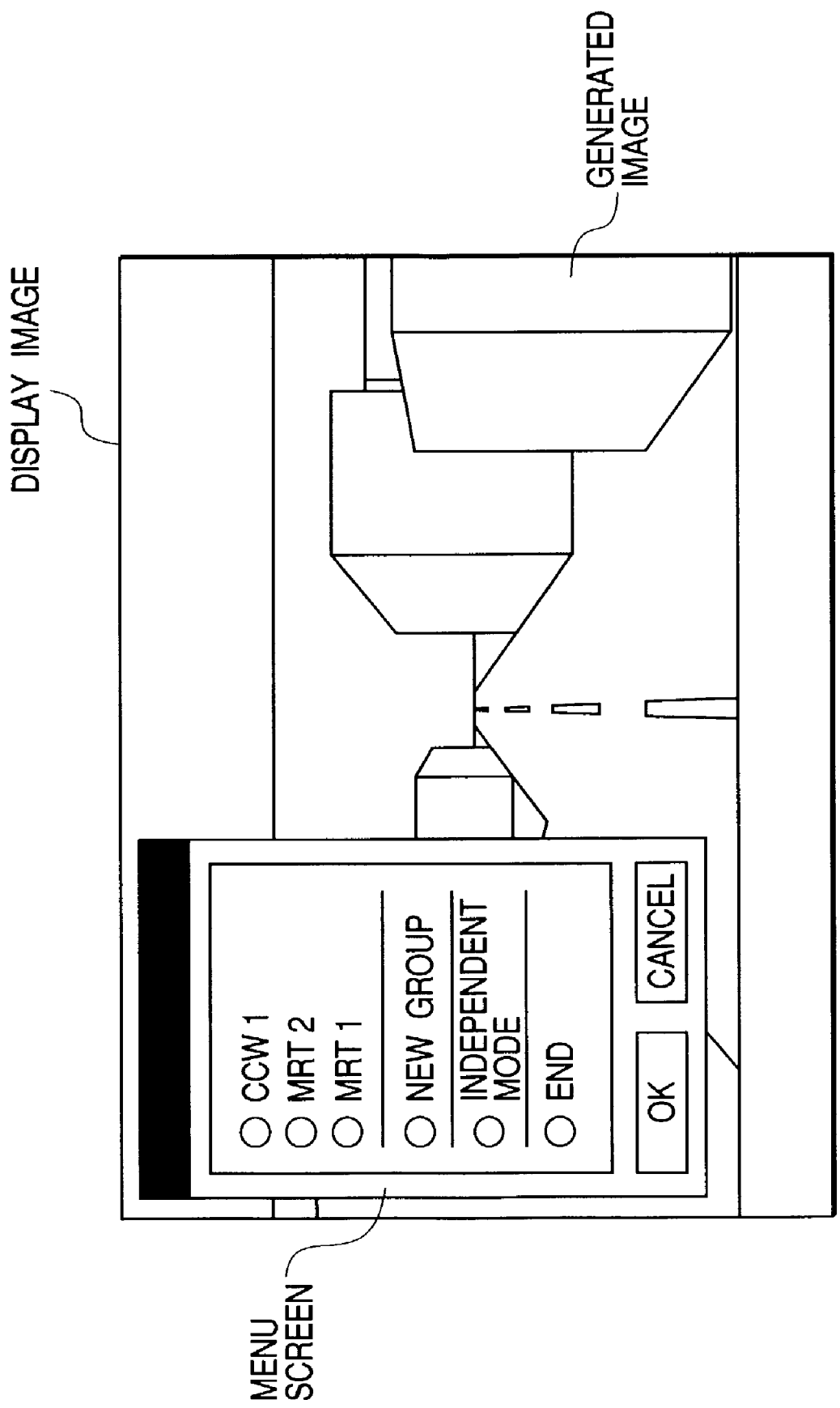
FIG. 17 is a diagram for explaining the display image which is obtained by superposing a list of group names on a generated image, according to the fourth embodiment.

Moreover, as shown in FIG. 17, it is possible to superpose a menu screen for a group process (i.e., a change of the group, a change of independent/sharing modes, etc.) on the generated image and display the obtained display image on the display unit 115. Here, for example, the menu screen includes a list of the names of other groups currently sharing the identical virtual space ("CCW1", "MRT2", "MRT1" in FIG. 17). Thus, if the user selects a desired group by handling the operation unit 111, it is possible to change the sharing group to the selected group. At this time, when the sharing group is changed to the selected group, if the sharing mode is selected and the user handling the operation unit 111 holds the control right, it is possible to shift a part or all of the users belonging to the pre-shift group to those sharing the selected group. Incidentally, if the user handling the operation unit 111 belongs to the selected group, it is possible to release this user from the selected group so that the apparatus of this user operates in the independent mode.

In addition to the group name, if various data such as a list of the names of the users belonging to each group, the name of the user holding the control right, the names of the contents, and the like are obtained from the control unit 102 through the calculation unit 112 and displayed, it is possible to more easily select a desired group. Moreover, on the list of the names of the users belonging to each group, if the name of only the user holding the control right is displayed with an attribute such as a different color, it is possible to easily discriminate the user holding the control right.

If the image being viewed by the group selected on the menu screen is superposed on the generated image or displayed on the part of the menu screen or on other window, it is possible to easily confirm the image capable of being viewed after the user comes into this group. Moreover, if selection items such as the creation of a new group, the selection of the independent mode, the end and the like are added to the menu screen in addition to the list of the group names, the user can create the new group to which only one user belongs, shift the sharing mode to the independent mode, end the program, by selecting the respective items. Here, the list of the group names or the like may not be superposed on the generated image, but may be created as a display image on other window.

Moreover, when the group is selected, a graphic such as an arrow or the like indicating at which direction the selected group views at which position may be obtained from the viewpoint information 406 corresponding to this group in the shared information (FIG. 14) and synthesized onto the map image of the virtual space held in the data unit 113, so that the obtained image and the generated image are synthesized to generate the display image (or displayed on other window).

Incidentally, in the state that the sharing mode is selected and the control right is held, if the control right is actively abandoned or the sharing mode is shifted to the independent mode, it is possible to designate the user next holding the control right. For example, if the user has the control right, an item "control right transfer" is displayed on the menu screen. Then, if this item is selected, a list of the names of the users belonging to the group to which the user in question belongs, whereby it is possible to designate the user who should have the control right next.

Incidentally, if the group of the independent mode is displayed and selected, for example, a mode change request to the sharing mode may be sent to the user holding the control right of this independent-mode group. Here, if the arrow graphic corresponding to the group of the independent mode and the arrow graphic corresponding to the sharing group are displayed respectively with different attributes, e.g., different colors, it is possible to easily discriminate the group of the independent mode.

The display unit 115 consists of, e.g., a projector and a screen to display the display image generated by the image generation unit 114. Incidentally, the display unit 115 is not limited to the projector and the screen, but may have an arbitrary structure such as a CRT, a liquid crystal monitor or the like if it can display images and text information. Moreover, plural display units 115 may be provided in one image information processing apparatus, and in this case, each of the numbers of the image generation units 114 and the data units 113 respectively corresponding to the calculation unit 112 is the same as, e.g., the number of the plural display units 115.

A not-shown conversation input unit of the image information processing apparatus 110 consists of, e.g., a microphone, and conversation information input to the conversion input unit is sent to a not-shown communication unit and then sent unit through the control unit 102 to a not-shown conversation output unit of each of the image information processing apparatuses used by the users belonging to the same group. Moreover, the conversation information sent to the communication unit is also output from a conversation output unit of each of these image information processing apparatuses. Here, the conversation output unit consists of, e.g., a speaker. By such a structure as above, the users in the same group can perform conversation, whereby it is possible to more smoothly achieve the real-world quasi-experience at the identical viewpoint. Here, it should be noted that the conversation information to be input to the conversation input unit is not limited to voice information, but may be text information. In this case, for example, the keyboard of the operation unit 111 may be used also for the conversation input unit, and the conversation output unit consists of a part of the display screen of the display unit 115 or an individual display device.

In such a system, the control apparatus 101 and the image information processing apparatuses 110 to 160 can be all realized by commercially available general-purpose computer equipment and its peripheral equipment. That is, when programs functioning as the control apparatus and the image information processing apparatuses are executed by using the general-purpose computer equipment having a CPU, a ROM, a RAM, a large-capacity storage (HDD), a CD/DVD drive (including a writable drive), an input device (a mouse, a keyboard, a joystick, a button, or the like), an output device (a CRT, an LCD, a printer, or the like), a network interface, a modem, a serial interface and the like, this system can be realized. Here, it should be noted that a part of the program might be basic software (OS) running on the computer equipment. Moreover, all the functions need not be achieved by software, that is, a part or all of the functions can be achieved by dedicated hardware. In FIG. 11, to assist operation explanation and understanding, the image information processing apparatuses and the control apparatus are illustrated in the form of functional blocks. However, the function in each functional block might be achieved by the plural structural components of the general-purpose computer equipment.

Figure 18:
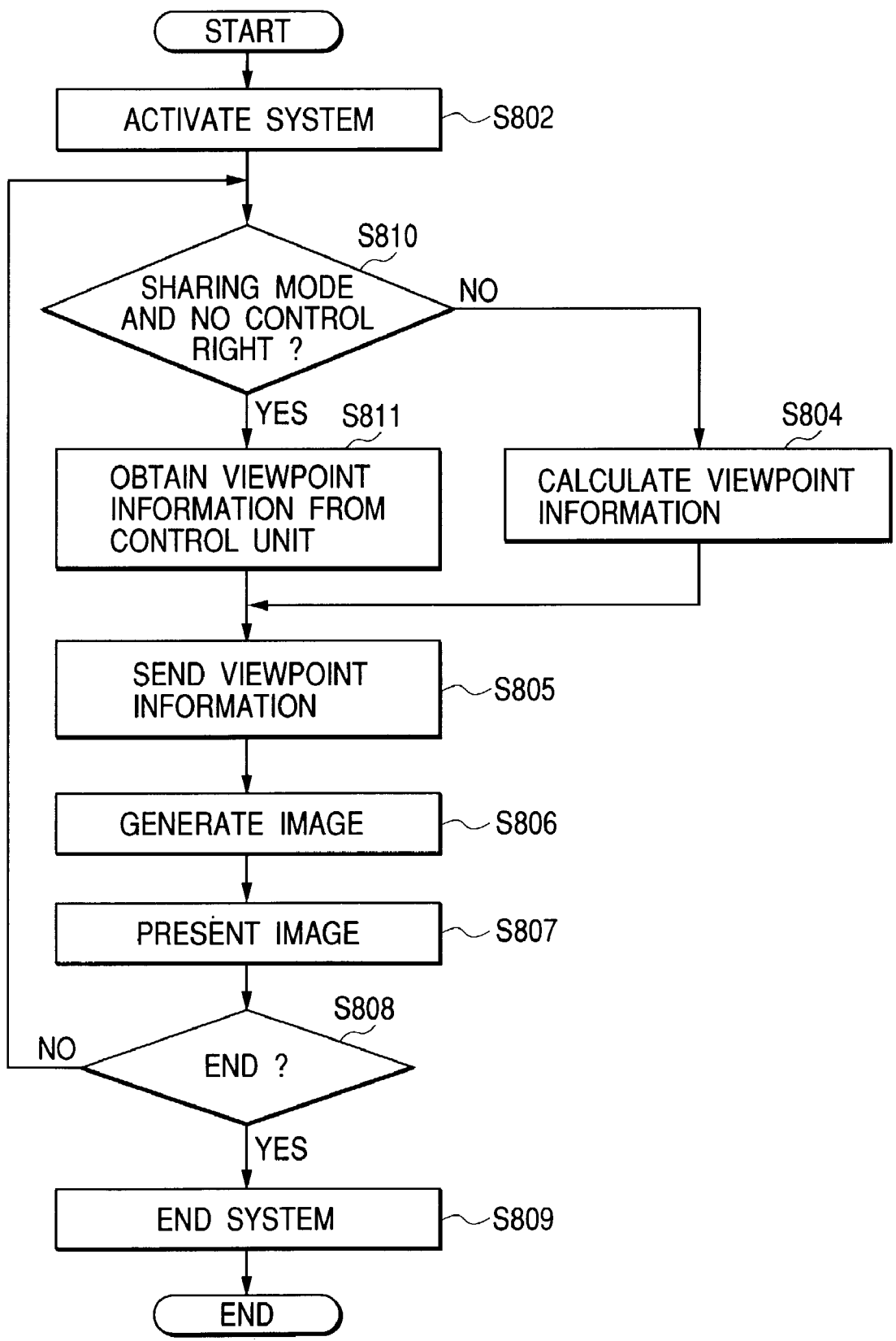
FIG. 18 is a flow chart for explaining a process procedure to generate the display image in an image information processing apparatus, according to the fourth embodiment.

Next, a display image generation process by the above image information processing apparatus will be explained in detail with reference to a flow chart shown in FIG. 18. Here, although the image generation process in the image information processing apparatus 110 will be explained as a typical example, all the image information processing apparatuses have the common structure, whereby it should be noted that the same process is performed in other image information processing apparatuses. Moreover, it is assumed that the data necessary to build the virtual space has been previously stored in the data unit 113. As the data to be previously prepared, for example, panoramic real-shot image data (and corresponding position information), text information, a map image, voice data and the like are quoted. Moreover, it is assumed that the control apparatus 101 has been already activated, and the control unit 102 has been already in the operable state.

In a step S802, the image information processing apparatus is activated to start the process. Then, in a step S810, the mode and the control right are judged. That is, if the sharing mode is selected and there is no control right, the flow advances to a step S811 to cause the calculation unit 112 to obtain the viewpoint information from the control unit 102. In other cases, that is, if the sharing mode is selected by the user of the image information processing apparatus 110 and also the control right is held by this user, or if the independent mode is selected, the flow advances to a step S804 to cause the calculation unit 112 to calculate the viewpoint information on the basis of the handling information sent from the operation unit 111.

If the calculation unit 112 receives a control right request from the operation unit 111 during the process, it sends the control right request to the control unit 102. Moreover, if the calculation unit 112 receives a request of the shared information from the operation unit 111, it sends this request to the control unit 102.

Next, in a step S805, the calculation unit 112 sends the calculated viewpoint information or the viewpoint information received from the control unit 102 to the image generation unit 114. Also, the calculation unit 112 sends the shared information received from the control unit 102 to the image generation unit 114.

Next, in a step S806, the image generation unit 114 obtains the image being the basis of the image generation from the data unit 113, and actually generates the image based on the viewpoint information and the shared information. Further, in a step S807, the image generated by the image generation unit 114 is presented or displayed on the display unit 115.

Then, it is judged in a step S808 whether or not the system should be ended. If judged that the system should be ended, the flow advances to a step S809 to end the system, while if judged that the system should not be ended, the flow returns to the step S810 to repeat the processes in the steps S811 and S804 to S807.

Next, a process procedure to change the sharing group in the image information processing apparatus will be explained with reference to a flow chart shown in FIG. 19.

In a step S901, for example, if a shared information selection button on the operation unit 111 is handled, the shared information request is sent to the control unit 102 through the calculation unit 112.

Next, in a step S902, the image generation unit 114 obtains the shared information from the control unit 102 through the calculation unit 112 to extract necessary information, e.g., the name of the sharing group. Then, in a step S903, the image generation unit 114 superposes the menu screen including the extracted information on the real-shot image as shown in FIG. 17 and displays the obtained image on the display unit 15 (here, the obtained image may be displayed on other window).

Further, in a step S904, the user handles the operation unit 111 to select the sharing group as viewing the display unit 115. As described above, for example, it is possible in this case to share with a desired group, create a new group to which only one user belongs, shift the sharing mode to the independent mode, end the program, and the like.

After then, in a step S905, the sharing group selection information is sent to the calculation unit 112, and the mode administrated by the calculation unit 112 is changed according to need. Besides, the sharing group selection information is sent to the control unit 102, and the shared information administrated by the control unit 102 is changed.

Figure 19:
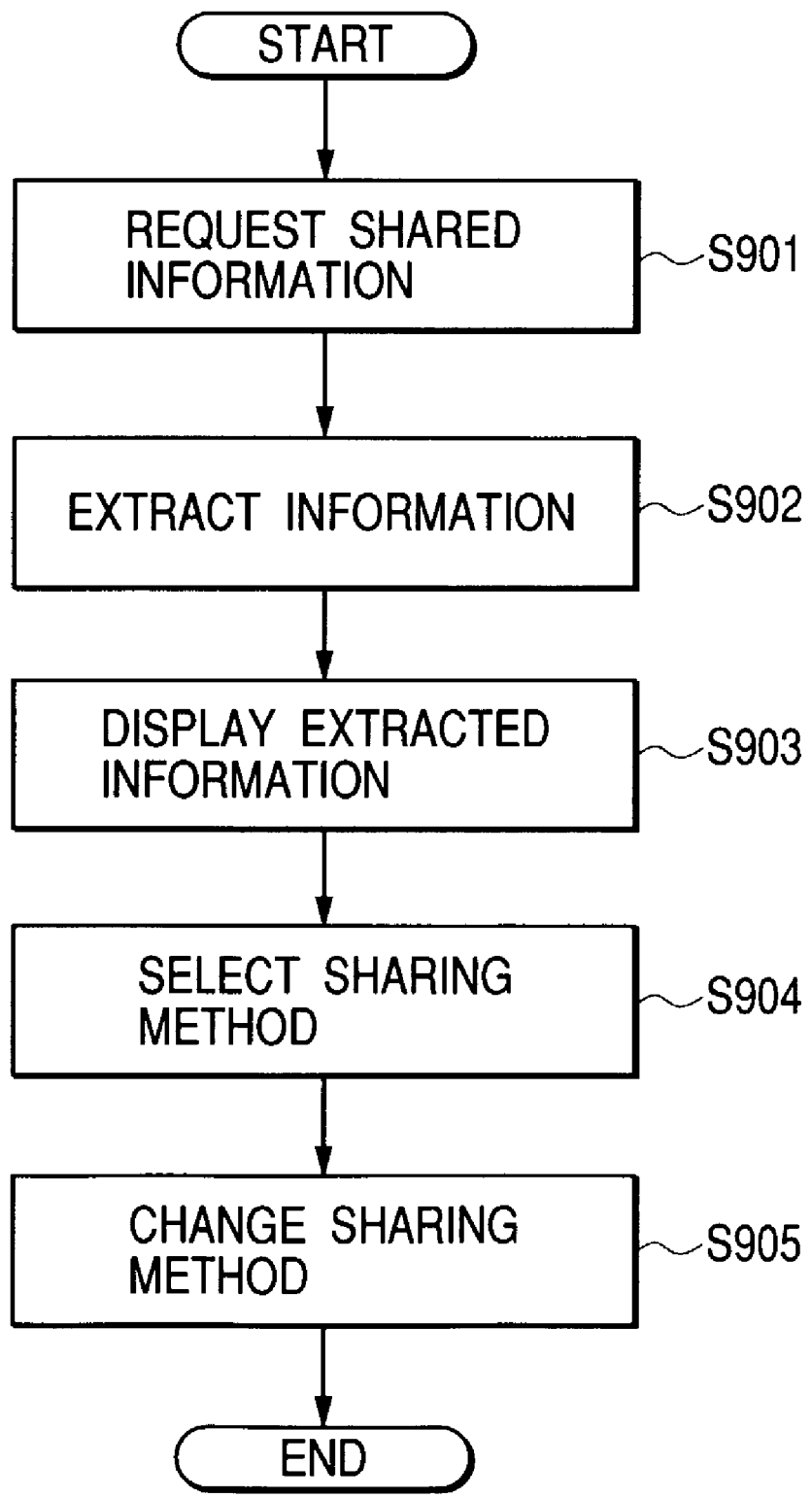
FIG. 19 is a flow chart for explaining a process procedure to change a sharing group in the image information processing apparatus, according to the fourth embodiment.

In FIG. 19, the case where the name of the sharing group is displayed on the menu screen is explained. However, various information such as the names of other uses belonging to the same sharing group, the name of the content used by the group, and the like administrated by the control unit 102 can be obtained by the similar process and displayed on the display unit 115.

As described above, according to the fourth embodiment, the sharing group can be easily changed by selecting it from the sharing group list. That is, when the mode is shifted to the mode shared with one group, it is possible to know beforehand the list of the users belonging to that group, the name of the content, and the like, whereby it is possible to prevent the inconvenience that the selected group is different from the desired group.

Moreover, according to the fourth embodiment, the user can easily know the users belonging to the same group, and easily discriminate the user holding the control right.

Fifth Embodiment

In the fifth embodiment, a sharing group selection method capable of intuitively changing a sharing group during a walk-through within a virtual space.

The block diagram showing the schematic structure of an information processing apparatus according to the present embodiment is substantially the same as the block diagram (FIG. 11) showing the schematic structure of the image information processing apparatus according to the fourth embodiment. However, operations of an operation unit 111, a calculation unit 112, a data unit 113 and an image generation unit 114 in the present embodiment are different from those in the fourth embodiment. Thus, the structures having the same functions as those of the image presentation apparatus according to the fourth embodiment will be refrained from explanation.

In the present embodiment, the operation unit 111 is used to designate a panoramic real-shot image being the basis of the above image generation, designate the portion cut out from the panoramic real-shot image, and send a control right request. Besides, the operation unit 111 is used to shift a pointer graphic, and select an arrow graphic. Thus, for example, a button for sending the control right request and a button for selecting the arrow graphic are provided on the operation unit 111. In any case, handling information generated by the operation unit 111 is sent to the calculation unit 112. Like the fourth embodiment, an input device such as a keyboard or the like may be provided on the operation unit 111, and a combination of plural inputs from the input device of the operation unit 111 may be allocated to one handling.

The calculation unit 112 performs the processes according to a selected mode, the state of a control right and the like. In a sharing mode, a user can perform a real-world quasi-experience at the identical viewpoint together with users of other image generation apparatuses, while in an independent mode, the user can perform the real-world quasi-experience at the viewpoint different from the users of other image generation apparatuses. If the selection information of the arrow graphic is sent from the operation unit 111, the calculation unit 112 changes the administrated mode according to need, and sends to the control unit a request to share the virtual space with the group corresponding to the selected arrow graphic.

If the sharing mode is selected and the control right is held, the calculation unit 112 calculates viewpoint information based on the handling information received from the operation unit 111 and sends the calculated viewpoint information to the control unit 102 and the image generation unit 114. Moreover, if the sharing mode is selected and the control right is not held, the calculation unit 112 sends viewpoint information received from the control unit 102 to the image generation unit 114. Here, if the control right request is received from the operation unit 111, the calculation unit 112 sends the control right request to the control unit 102. Moreover, if the independent mode is selected, the calculation unit 112 calculates the viewpoint information based on the handling information received from the operation unit 111 and sends the calculated viewpoint information to the image generation unit 114. Besides, the calculation unit 112 sends the shared information request to the control unit 102, and sends the shared information received from the control unit 102 to the image generation unit 114.

The data unit 113 which consists of, e.g., a hard disk holds the data to be sent to the image generation unit 114, and sends the data according to a request from the image generation unit 114 to the image generation unit 114. The data unit 113 has previously obtained a part or all of specific content data from data servers corresponding to contents through a not-shown communication line or the like. For example, the content data includes panoramic real-shot image data at one or more points along routes such as roads or the like (each panoramic real-shot image may be held as one of divided images), data concerning a date, a time, a position and a posture, map image data, voice data, and the like. Besides, for example, the panoramic real-shot image included in the content data is generated by synthesizing images shot along the routes such as the roads or the like by one or more video cameras arranged to be able to shoot all directions, and the generated panoramic real-shot image is correlated with position information at the shoot position and posture information at the shoot time. Incidentally, the data unit 113 is not limited to the hard disk, but may be any medium capable of storing data, for example, a medium of arbitrary storage system such as a magnetic recording medium, an optical (magnetooptical) recording medium, a semiconductor storage medium or the like, and also a medium of arbitrary shape such as a tape medium, a disk medium, a card medium or the like.

In the present embodiment, the data to be sent to the image generation unit 114 is held in the data unit 113 of the image information processing apparatus. However, the data may be held in a not-shown data server so that the user obtains it from the data server according to need.

Here, shoot route information includes, e.g., data representing a point (called a turning point hereinafter) for separating the shoot route and data representing a line segment (called a route hereinafter) connecting the adjacent turning points. At this time, an ID (identification) is added to each of the turning points and the routes, whereby each point and route is uniquely specified. Here, it should be noted that the line segment connecting the adjacent turning points is a straight line or a curved line representing an interval between the adjacent turning points.

Although there are various methods to describe the turning points and the routes, it is assumed that in the present embodiment the turning points and the routes are described in manner of FIGS. 20A and 20B. FIG. 20A is the diagram for explaining a description example of the turning points, and FIG. 20B is the diagram for explaining a description example of the routes. As shown in FIG. 20A, in a turning point list 1000, a turning point ID 1001 is described to specify each turning point, coordinates 1002 are described to represent the position of each turning point, and further a turning point name 1003 is described. Here, it should be noted that the turning point name 1003 may be omitted.

Moreover, as shown in FIG. 20B, in a route list 1010, a route ID 1011 is described to specify each route, a start turning point 1012 and an end turning point 1013 are described to represent ID's of both the ends of each route, and a route name 1014, a start frame number 1015 and an end frame number 1016 are further described. Here, it should be noted that the route name 1014 may be omitted, and the start frame number 1015 and the end frame number 1016 represent the frame numbers of the panoramic real-shot image respectively corresponding to the start turning point 1012 and the end turning point 1013. For example, the frame number is specified based on the position posture information of the shoot point correlated with the panoramic real-shot image.

Incidentally, the turning point and the frame number may be automatically correlated according to, e.g., the position posture information at the shoot point, or may be manually correlated by the user. Moreover, if the position information of each panoramic real-shot image in a panoramic real-shot image group obtained between the adjacent turning points is equally allocated on, e.g., the line segment connecting these turning points, the correlating data can be generated and held without using the position posture information at the shoot point.

In addition, attribute information of each route may be described in shoot route information. As the attribute information, for example, the width of the shoot route, information representing that the shoot route is interior or exterior, and the like can be described.

The image generation unit 114 obtains the panoramic real-shot image being the basis of the image generation from the data unit 113, generates an image according to the viewpoint information, and displays the generated image on the display unit 115, in accordance with the viewpoint information sent from the calculation unit 112. Moreover, the image generation unit 114 extracts the necessary information from the shared information sent from the calculation unit 112, generates an image obtained by superposing the extracted information on the above generated image, and then sends the obtained image to the display unit 115.

Figure 21:
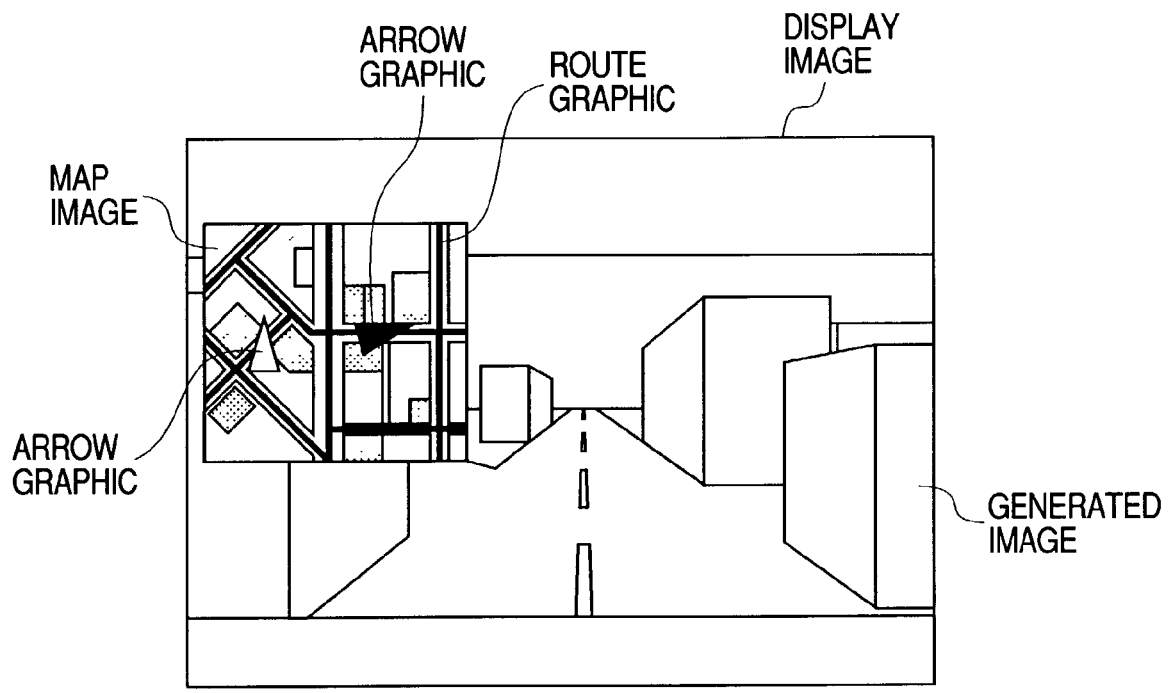
FIG. 21 is a diagram for explaining a display image which is obtained by superposing a route graphic and arrow graphics on a generated image, according to the fifth embodiment.

For example, as shown in FIG. 21, on the basis of the shoot route information held in the data unit 113, a route graphic representing the shoot route is generated and synthesized on a map image, an arrow graphic representing the viewpoint information (viewpoint position and direction) of each group is synthesized at the position on the route graphic corresponding to the viewpoint information 406 of each group, the obtained image is further synthesized to the generated image to generate the display image, and the generated display image is finally displayed on the display unit 115 (the map image on which the arrow graphic has been synthesized and the generated image may be displayed on other window).

Here, if the arrow graphic corresponding to the group to which the user belongs is made visually different from the arrow graphic corresponding to other group with respect to colors, shapes, visual effects (blinking or the like), and the like, it is possible to easily discriminate the group to which the user belongs. Similarly, even if a new user participates in the group during the walk-through operation, or the user leaves from the group, a change of the state of the group can be easily discriminated by making the arrow graphic visually different from that in the ordinary state. Moreover, when a new group is generated during the walk-through operation, an arrow graphic representing this group may be newly added on the route graphic.

Figure 22:
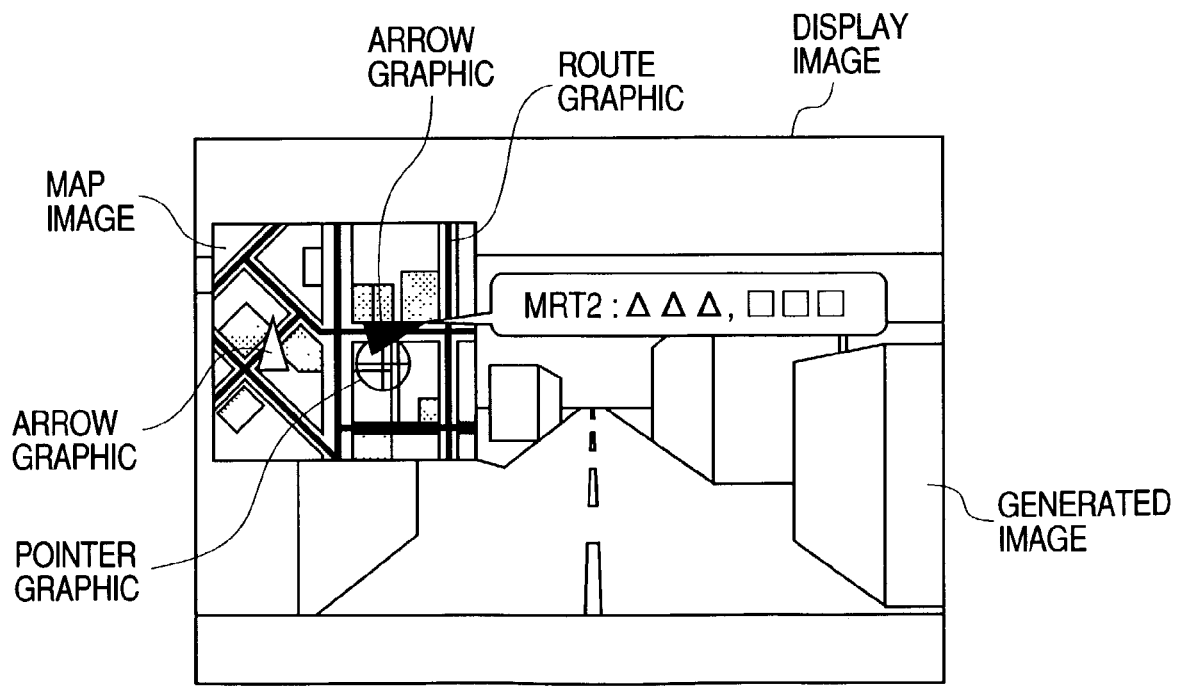
FIG. 22 is a diagram for explaining the display image which is obtained by superposing the route graphic and the arrow graphics on the generated image and further displays a group name corresponding to the arrow graph, according to the fifth embodiment.

Moreover, for example, as shown in FIG. 22, if the user moves the pointer graphic such as a cursor or the like by handling the operation unit 111 to superpose it on the arrow graphic in the map image so that the group name, the viewpoint position information and the like corresponding to this arrow graphic is displayed, then it is possible to easily discriminate this group name. Such a display operation may be achieved in the form of pop-up display as shown in FIG. 22, or performed in a non-display area on the map image and the generated image. For example, if the button provided on the operation unit 111 is depressed, it is possible to mutually change the handling target by the operation unit 111 between the walk-through viewpoint position and the pointer graphic on the map image.

In the information to be displayed when the arrow graphic is selected, the name of the group, the viewpoint position information, the name of the user belonging to this group, and the like can be arbitrarily changed. Here, these names and the like can be obtained from the control unit 102 through the calculation unit 112 and simultaneously displayed, whereby the user belonging to that group can be easily discriminated. Moreover, in case of displaying the user names, if the display of the user holding the control right is made visually different from other users, the user holding the control right can be easily discriminated. Moreover, if the image viewed by one group is displayed on, e.g., other window by using the viewpoint position information, the image which can be viewed by the user if he participates in this group can be easily confirmed.

Moreover, if the contents of the conversation in the selected group are requested to the control unit 102 and output to a not-shown conversation output unit instead of the contents of the conversation in the group to which the user currently belongs, it is possible to listen to the contents of the conversation in the selected group. That is, if the information concerning the selected group is received, the control unit 102 temporarily outputs, also to the image information processing apparatus 101, conversation information broadcasted to the users belonging to the selected group. Here, even if the pointer graphic is not superposed on the arrow graphic, it is possible to always display the list of the names of group and users corresponding to each arrow graphic.

Moreover, if the user handles the operation unit 111 to superpose the pointer graphic on the arrow graphic and depresses the button provided on the operation unit 111 to select the arrow graphic, it is possible to share the virtual space with the group corresponding to the selected arrow graphic. Here, in case of sharing the virtual space with the selected group, if the sharing mode is selected and the user handling the operation unit 111 holds the control right, it is possible to move a part or all of the users belonging to the previous group to share the selected group. Incidentally, if the user handling the operation unit 111 belongs to the group corresponding to the selected arrow graphic, it is possible to leave this user from this group and set the independent mode. Conversely, if the user is in the independent mode, it is possible to change the independent mode to the sharing mode by selecting the arrow graphic.

If the user superposes the pointer graphic on the arrow graphic and depresses the button provided on the operation unit 111, it is possible to display the group name or the like corresponding to the arrow graphic. Then, if the user depresses the same or different button provided on the operation unit 111, it is possible to change the mode to the sharing mode to share the virtual space with the group corresponding to the selected arrow graphic.

In addition, it is possible to display an arrow graphic or information concerning the group in the independent mode. In this case, if the arrow graphic corresponding to the group in the independent mode is selected, for example, it is possible to send, to the user holding the control right of this group, a request to change the independent mode to the sharing mode. Here, if the display of the arrow graphic corresponding to the group in the independent mode is made visually different from other groups, it is possible to easily discriminate the group in the independent mode.

Figure 23:
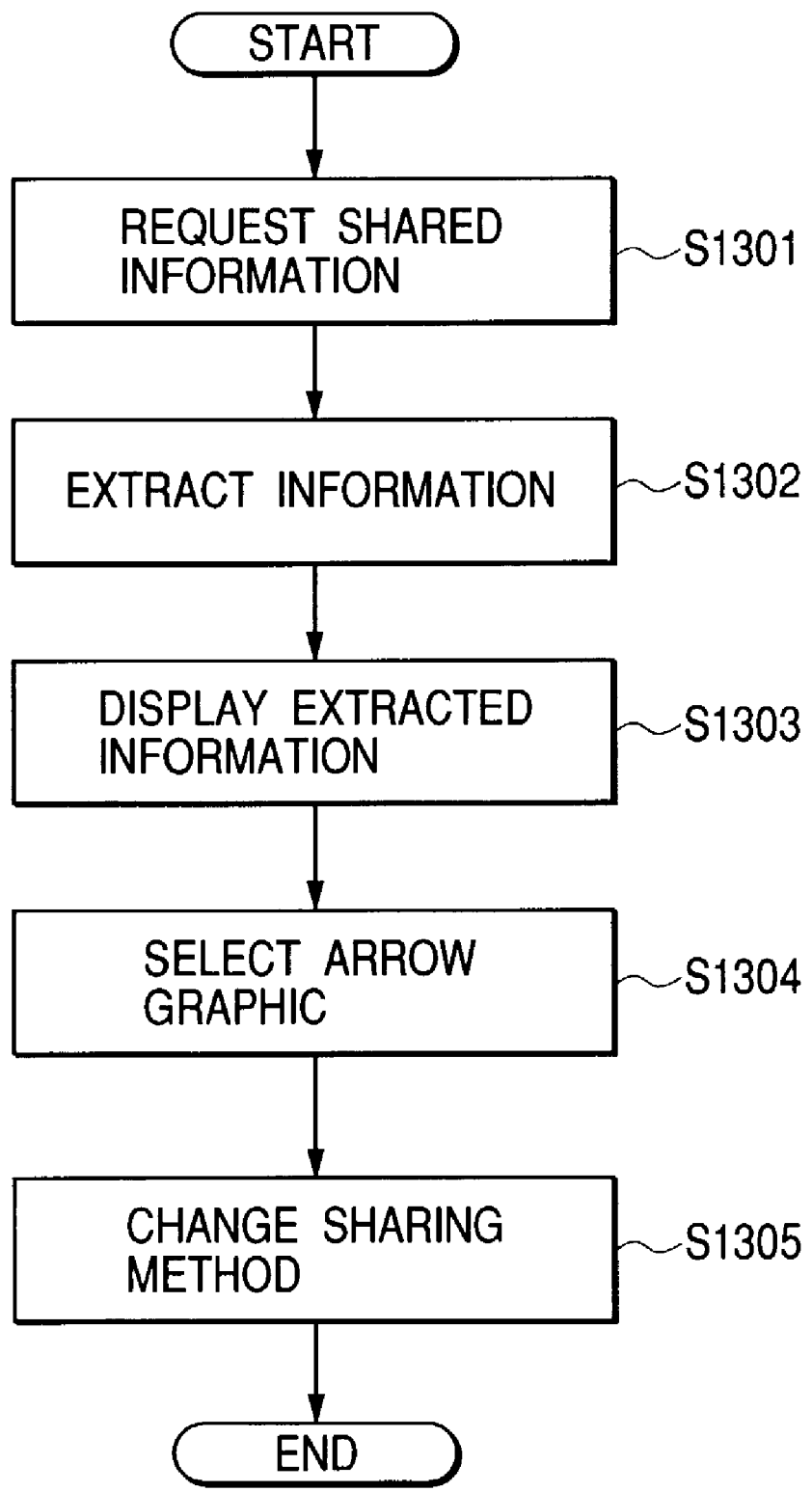
FIG. 23 is a flow chart for explaining a process procedure to change a sharing group in an image generation apparatus according to the fifth embodiment.

Next, a sharing group change process in the image information processing apparatus according to the present embodiment will be further explained with reference to a flow chart shown in FIG. 23. Here, although the image generation process in the image information processing apparatus 110 will be explained as a typical example, all the image information processing apparatuses have the common structure, whereby it should be noted that the same process is performed in other image information processing apparatuses. Incidentally, the display image generation process in the image information processing apparatus according to the present embodiment may be basically the same as that explained in the fourth embodiment, except that a map graphic is generated instead of the menu screen. Moreover, it is assumed that the data necessary to build the virtual space has been previously stored in the data unit 113. As the data to be previously prepared, for example, panoramic real-shot image data (and corresponding position information), text information, a map image and the like are quoted. Moreover, it is assumed that the control apparatus 101 has been already activated, and the control unit 102 has been already in the operable state.

In a step S1301, the calculation unit 112 sends the request of the shared information to the control unit 102. Next, in a step S1302, the image generation unit 114 obtains the shared information from the control unit 102 through the calculation unit 112 and extracts the necessary information from the obtained information.

Next, in a step S1303, the image generation unit 114 displays the extracted information on the display unit 115 together with the panoramic real-shot image. For example, on the basis of the shoot route information held in the data unit 113, the route graphic representing the shoot route is generated, the arrow graphic representing the viewpoint information of each group is synthesized at the position corresponding to the viewpoint information 406 on the route graphic, and the obtained image is synthesized to the generated image, whereby the display image is generated and displayed on the display unit 115.

Thus, the user handles the operation unit 111 to select the arrow graphic as viewing the display unit 115. For example, the user superposes the pointer graphic on the arrow graphic and depresses the button provided on the operation unit 111 to select the arrow graphic.

Next, in a step S1304, the selection of the arrow graphic is detected. Then, in a step S1305, the selection information of the arrow graphic is sent to the calculation unit 112, whereby the calculation unit 112 changes the administrated mode according to need. Moreover, the calculation unit 112 sends the request of the sharing of the virtual space with the group corresponding to the selected arrow graphic to the control unit 102, whereby the control unit 102 changes the administrated shared information. By such a method as above, it is possible to change the group to a desired sharing group.

Although the case where the arrow graphic on the route graphic already displayed is selected is shown in the present embodiment, the present invention is not limited to this. That is, the contents are first selected by such a method of depressing the button on the operation unit 111, the route graphics and the arrow graphics according to the selected contents are newly displayed, and the desired arrow graphic is selected from these graphics. By doing so, it is possible to change the sharing state to share the virtual space with the group selecting other contents.

As described above, according to the fifth embodiment, the sharing group can be intuitively changed by selecting the arrow graphic displayed on the route graphic. That is, when the mode is changed to the sharing mode to share the virtual space with one group, it is possible to know beforehand the list of the names of the users belonging to this group, the image viewed in this group, the conversation contents and the like, whereby it is possible to prevent that the user participates in the group different from his desirable group.

In the fifth embodiment, by selecting the arrow graphic on the route graphic, the group is selected, the information concerning the selected group is displayed, and the like. On one hand, by moving the pointer graphic to the position other than the arrow graphic on the route graphic and then selecting the position of the pointer graphic by means of depression of the selection button provided on the operation unit 111, the viewpoint position of the group to which the user belongs can be shifted to the selected position. Here, in case of shifting the viewpoint to the selected position, if the sharing mode is selected and the user handling the operation unit 111 has the control right, it is possible to shift a part or all of the viewpoints of the users belonging to the pre-shift group to the selected position. By doing so, unlike the shift of the viewpoint position according to the ordinary walk-through, it is possible to directly shift the viewpoint position to the distant position.

In the above embodiments, the kinds of various information concerning the users and the groups, and the operations to be performed when the information, the graphics and the like are selected, which are displayed together with the virtual space image, can be arbitrarily set according to the contents and other specifications. Moreover, the shared information and the user information obtained from the control unit 102 may be entirely obtained at the beginning. Alternatively, a part of the information may be obtained at the beginning, and then the remaining information may be obtained according to the user's selection.

Other Embodiment

In the above embodiments, the image information processing apparatus which consists of one device is explained. However, it is possible to achieve the function equivalent to that of the image information processing apparatus by a system which consists of plural devices.

Moreover, in the above embodiments, the structure having the control apparatus is provided in addition to the image information processing apparatus. However, it is possible to cause each image information processing apparatus to include the function of the control apparatus, whereby the control apparatus becomes unnecessary in such a case.

The present invention also includes a case where a program (a program corresponding to one or more flow charts) of software to achieve the functions of the above embodiments is supplied, directly or by using wire/wireless communication, to a system or an apparatus having a computer capable of executing the program, and the computer of the system or the apparatus executes the supplied program to achieve the function equivalent to the functions of the above embodiments.

Therefore, in order to achieve the functional process in the present invention, the program codes themselves to be supplied to or installed on the computer achieve the present invention. That is, the computer program itself to achieve the functional process of the present invention is included in the present invention.

In this case, if the program has the function equivalent to the functions of the above embodiments, the pattern of the program is no object. That is, for example, an object code, a program executed by an interpreter, script data to be supplied to an OS (operating system), and the like can be used.

As the storage medium for supplying the program, for example, a magnetic recording medium such as a flexible disk, a hard disk, a magnetic tape or the like, an optical/ magnetooptical storage medium such as an MO, a CD-ROM, a CD-R, a CD-RW, a DVD-ROM, a DVD-R, a DVD-RW or the like, a non-volatile semiconductor memory, or the like can be used.

As a method of supplying the program by means of the wire/wireless communication, a method of storing, in a server on a computer network, the computer program itself to achieve the present invention, or a data file (program data file), such as a file or the like including a compression and automatic install function, capable of acting as the computer program to achieve the present invention on a client computer, and downloading the program data file to the connected client computer, or the like can be adopted. In this case, it is possible to divide the program data file into plural segment files and distribute and arrange the divided segment files on different servers.

That is, the present invention also includes the server apparatus which downloads the program data file for achieving the functional process of the present invention on the computer to plural users.

Moreover, it is possible to encrypt the program of the present invention, store the encrypted program in the storage medium such as the CR-ROM or the like, distribute the storage medium to the user, supply key information for decrypting the encrypted program to the user who meets a predetermined condition by downloading it from a home page through, e.g., the Internet, execute the encrypted program by using the key information, and install the program in the computer to achieve the functions of the above embodiments.

Moreover, the functions of the above embodiments can be achieved not only in a case where the functions of the present embodiments are realized by executing the program read by the computer, but also in a case where the OS or the like running on the computer performs a part or all of the actual processes according to instructions of the program, thereby realizing the functions of the above embodiments.

Moreover, the functions of the above embodiments can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

While the present invention has been described in connection with the preferred embodiments, it will be understood that it is not intended to limit the present invention to these embodiments. On the contrary, it is intended to cover all alternatives, modifications and equivalents as may be included within the spirit and scope of the present invention as defined by the appended claims.

What is claimed is:

1. A virtual space presentation apparatus which generates a display image of a virtual space according to a viewpoint position designated by a first user, and presents the generated display image to the first user, comprising:

a grouping unit, arranged to divide a plurality of users including the first user into groups based on viewpoint positions, the plurality of users sharing the virtual space;

a user information obtaining unit, arranged to obtain user information concerning a one or more users included in each of the groups divided by said grouping unit;

a user information image generation unit, arranged to generate a user information image on the basis of the user information;

a display unit, arranged to present, to the first user, the user information image superimposed on the generated display image;

a selection unit, arranged to enable the first user to select an element in the user information image; and a request unit, arranged to send, if a group in an independent mode for displaying an image in a viewpoint different from other users is selected in the user information image by using said selection unit, to a user having the control right of the selected group, a request for requesting the user having the control right to change the selected group from the independent mode to a shared mode for displaying the image in a viewpoint shared by other users.

2. An apparatus according to claim 1, wherein the user information includes information concerning a group composed of the users sharing the identical viewpoint position.

3. An apparatus according to claim 2, wherein the user information image includes at least one of a name of a user having a control right, the viewpoint position information of the group, the display image presented to the users belonging to the group, and a map image of a virtual space on which a graphic representing the viewpoint position of each group has been superposed.

4. An apparatus according to claim 1, wherein, if the element in the user information image is selected by using said selection unit, said display unit further displays additional information concerning the selected element.

5. An apparatus according to claim 4, wherein, if the element corresponding to the group is selected in the user information image by using said selection unit, at least one of the information concerning the users belonging to the group, the viewpoint position information of the group, and the display image presented to the users belonging to the group is displayed as the additional information.

6. An apparatus according to claim 1, further comprising a user information output unit, arranged to output, if the element corresponding to the selected group is selected in the user information image by using said selection unit, information representing that the group to which a user belongs has been changed to the group corresponding to the selected element.

7. An apparatus according to claim 1, further comprising a user information output unit, arranged to output, if the element corresponding to an independent group is selected in the user information image by using said selection unit, information for requesting the user having the control right of the independent group to change the group to a group capable of being shared.

8. An apparatus according to claim 1, wherein the first user is the user having the control right, wherein said apparatus further comprises a user information output unit, arranged to output, if the user having the control right of the group selects the element in the user information image corresponding to another user belonging to the same group and included in the user information image, information representing that the control right has been shifted to the other user.

9. An apparatus according to claim 1, wherein, if the element corresponding to the selected group is selected in the user information image by using said selection unit, said user information obtaining unit obtains a voice of a user belonging to the selected group and outputs the obtained voice through a voice output unit.

10. An apparatus according to claim 1, further comprising a storage unit, arranged to store the user information dividing the plurality of users into plurality of the groups based on a viewpoint position of each of the plurality of users, wherein said user information obtaining unit obtains the user information concerning the plurality of users from said storage unit.

11. An apparatus according to claim 1, further comprising a control right storage unit, adapted to store control information of a user having a control right for controlling the viewpoint position, wherein said control right storage unit stores a plurality of user control information in order.

12. A control method of a virtual space presentation apparatus generating a display image of a virtual space according to a viewpoint position designated by a first user, and presenting the generated display image to the first user, said method comprising:

a grouping step of dividing a plurality of users including the first user into groups based on viewpoint positions, the plurality of users sharing the virtual space;

a user information obtaining step of obtaining user information concerning one or more users included in each of the groups divided in said grouping step;

a user information image generation step of generating a user information image on the basis of the user information obtained in said user information obtaining step;

a display step of presenting, to the first user, the user information image superimposed on the generated display image;

a selection step of enabling the first user to select an element in the user information image; and a request step of sending, if a group in an independent mode for displaying an image in a viewpoint different from other users is selected in the user information image by using said selection step, to a user having the control right of the selected group, a request for requesting the user having the control right to change the selected group from the independent mode to a shared mode for displaying the image in a viewpoint shared by other users.

13. A control method according to claim 12, further comprising a step of storing, in a storage unit, the user information dividing the plurality of users into the groups based on a viewpoint position of each of the plurality of users, wherein, in said user information obtaining step, the user information concerning the plurality of users is obtained from the storage unit.

* * * * *